United States Patent
Layman, Jr.

(10) Patent No.: US 12,234,304 B2
(45) Date of Patent: Feb. 25, 2025

(54) PROCESS AND CATALYST FOR HYDROGEN MEDIATED SALINE HYDRIDE INITIATED ANIONIC CHAIN TRANSFER POLYMERIZATION

(71) Applicant: ALBEMARLE CORPORATION, Charlotte, NC (US)

(72) Inventor: William J. Layman, Jr., Baton Rouge, LA (US)

(73) Assignee: ALBEMARLE CORPORATION, Charlotte, NC (US)

( * ) Notice: Subject to any disclaimer, the term of this patent is extended or adjusted under 35 U.S.C. 154(b) by 212 days.

(21) Appl. No.: 18/156,648

(22) Filed: Jan. 19, 2023

(65) Prior Publication Data

US 2023/0227591 A1    Jul. 20, 2023

Related U.S. Application Data

(62) Division of application No. 16/095,202, filed as application No. PCT/US2017/026340 on Apr. 6, 2017, now Pat. No. 11,591,420.

(60) Provisional application No. 62/325,149, filed on Apr. 20, 2016.

(51) Int. Cl.
| | | |
|---|---|---|
| C08F 112/08 | (2006.01) | |
| C08F 2/38 | (2006.01) | |
| C08F 4/46 | (2006.01) | |
| C08K 5/05 | (2006.01) | |
| C08K 5/17 | (2006.01) | |
| C08K 5/57 | (2006.01) | |

(52) U.S. Cl.
CPC ............. *C08F 112/08* (2013.01); *C08F 2/38* (2013.01); *C08F 4/461* (2013.01); *C08K 5/05* (2013.01); *C08K 5/175* (2013.01); *C08K 5/57* (2013.01); *C08F 2410/01* (2013.01); *C08F 2500/02* (2013.01)

(58) Field of Classification Search
CPC .......... C08F 4/465; C08F 4/482; C08F 36/04; C08F 36/06; C08F 36/08; C08F 36/14; C08F 36/16; C08F 36/18
See application file for complete search history.

(56) References Cited

U.S. PATENT DOCUMENTS

| | | |
|---|---|---|
| 2,985,594 A | 5/1961 | Zimmermann et al. |
| 3,306,949 A | 2/1967 | Mertzweiller et al. |
| 3,352,934 A | 11/1967 | House et al. |
| 3,716,594 A | 2/1973 | Hoshino et al. |
| 8,217,120 B2 | 7/2012 | Dershem |
| 8,796,388 B2 | 8/2014 | Layman, Jr. et al. |
| 11,591,420 B2 | 2/2023 | Layman, Jr. |
| 2011/0130520 A1 | 6/2011 | Layman, Jr. et al. |
| 2015/0175797 A1 | 6/2015 | Layman, Jr. et al. |
| 2019/0161566 A1 | 5/2019 | Layman, Jr. |

FOREIGN PATENT DOCUMENTS

| | | |
|---|---|---|
| EP | 0741147 A1 | 11/1996 |
| EP | 3445791 A1 | 2/2019 |
| GB | 923350 A | 4/1963 |
| JP | H11286507 | 10/1999 |
| JP | 2005513172 A | 5/2005 |
| JP | 2005534776 A | 11/2005 |
| JP | 2007297617 A | 11/2007 |
| JP | 2010529264 A | 8/2010 |
| JP | 2019513862 A | 5/2019 |
| WO | 2009148464 A1 | 12/2009 |
| WO | 2017176740 A1 | 10/2017 |
| WO | 2017184350 A1 | 10/2017 |

OTHER PUBLICATIONS

Menoret et al., Macromolecules 2003, 36, 5988-5994.*
Murahashi, S. et al., Polymerization of Styrene with the Ziegler-Natta Catalysts in the Presence of Molecular Hydrogen, Short Communications, Mar. 1960, pp. 431-432, vol. 33, No. 3, Department of Polymer Science Faculty of Science, Osaka University, Japan, all enclosed pages cited.
Ashby, E., et al., Concerning the Reactions of Lithium, Sodium, and Potassium Hydrides with Magnesium Halides in Ether Solvents. A Convenient and Economic Route to Reactive Magnesium Hydride, Inorganic Chemistry, 1971, pp. 355-357, vol. 10. No. 2, United States, all enclosed pages cited.
Ashby, E., et al., The preparation of the Soluble ROMgH and ROMg2H3 Compounds and Their Unusual Stereoselectivity in the Reduction of Cyclohexanones, Tetrahedron Letters, 1977, pp. 3133-3136, No. 36, Great Britain, all enclosed pages cited.
Rudin, A., The Elements of Polymer Science and Engineering: An Introductory Text for Engineers and Chemists, 1984, pp. 54-58, Elsevier Science and Technology Books, all enclosed pages cited.
Klusener, P., et al., Superactive Alkali Metal Hydride Metalation Reagents: LiH, NaH, and KH, 1986, pp. 465-466, vol. 25, No. 5, Angew. Chem. Int. Ed. Engl., Weinheim, Germany, all enclosed pages cited.
Pi, et al., Representative Metalation and Reduction Reactions of the Superactive Metal Hydrides LiH, NaH, and KH, Journal or Organic Chemistry, 1987, pp. 4299-4303, vol. 52, No. 19, American Chemical Society, all enclosed pages cited.

(Continued)

*Primary Examiner* — Vu A Nguyen
(74) *Attorney, Agent, or Firm* — Nathan C. Dunn

(57) ABSTRACT

This invention relates to processes for forming hydrogen mediated saline hydride initiated anionic polystyrene distributions via novel polymerization conditions. This invention also relates to novel hydrocarbon soluble super active saline hydride catalyst and reagent compositions useful in conducting the hydrogen mediated saline hydride initiated polymerizations of this invention. This invention also relates to novel low molecular weight polystyrene polymer composition formed exclusively from styrene and molecular hydrogen as the monomers.

9 Claims, No Drawings

(56) References Cited

OTHER PUBLICATIONS

Michalczyk, M., Synthesis of Magnesium Hydride by the Reaction of Phenylsilane and Dibutylmagnesium, Organometallics, 1992, pp. 2307-2309, vol. 11, No. 6, American Chemical Society, all enclosed pages cited.

Zhang, Y., et al., Highly Active Alkali Metal Hydrides; their Catalytic Syntheses and Properties, Journal of Molecular Catalysis, 1993, pp. 211-221, vol. 84, Elsevier Science Publishers B.V., Amsterdam, Netherlands, all enclosed pages cited.

DeLong, G., et al., Decomposition of tert-Butyllithium/Lithium tert-Butoxide Mixed Aggregates: NMR Evidence for the Formation of Novel Mixed Lithium Hydride/Lithium tert-Butoxide Aggregates, Journal of American Chemistry Society, 1997, pp. 11998-11999, vol. 119, No. 49, American Chemical Society, all encloses pages cited.

Hoffman, D., et al., X-Ray Structural Analysis of a Novel Lithium Hydride/Lithium tert-Butoxide Superaggregate: Li33H17(OtBu)16, Communications, 1998, pp. 1537-1539, vol. 37, No. 11, Angew. Chem. Int. Ed., Weinheim, Germany, all enclosed pages cited.

Tomotsu, N., et al., Syndiospecific Polymerization of Styrene, Journal of Molecular Catalysis A, 1998, pp. 167-190, vol. 128, Elsevier Science B.V., all encloses pages cited.

Ménoret, S., et al., Initiation of Retarded Styrene Anionic Polymerization Using Complexes of Lithium Hydride with Organometallic Compounds, American Chemical Society: Macromolecules, 2003, pp. 5988-5994, No. 36, all enclosed pages cited.

Fan, Y., et al. Chemical Reactivity and Thermal Stability of Nanometric Alkali Metal Hydrides, Journal of Nanoparticle Research, 2006, pp. 935-942, Springer, all encloses pages cited.

Stasch, A., A Hydrocarbon-Soluble Lithium Hydride Complex, Angewandte Chem. International Edition, 2012, pp. 1930-1933, No. 51, all enclosed pages cited.

Fohlmeister, L., et al., Alkali Metal Hydride Complexes: Well-Defined Molecular Species of Saline Hydrides, Australian Journal of Chemistry, 2015, pp. 1190-1201, vol. 68, all enclosed pages cited.

International Search Report and Written Opinion of corresponding International Application No. PCT/US2017/026340 mailed Jul. 14, 2017, all enclosed pages cited.

International Preliminary Report on Patentability of corresponding International Application No. PCT/US2017/026340 issued Oct. 23, 2018, all enclosed pages cited.

* cited by examiner

PROCESS AND CATALYST FOR HYDROGEN MEDIATED SALINE HYDRIDE INITIATED ANIONIC CHAIN TRANSFER POLYMERIZATION

CROSS-REFERENCE TO RELATED APPLICATIONS

This application, filed Jan. 19, 2023, is a Divisional of U.S. patent application Ser. No. 16/095,202 filed on Oct. 19, 2018, which is a national entry under 35 U.S.C. § 371 of Patent Cooperation Treaty Application No.: PCT/US2017/026340 filed Apr. 6, 2017, which claims priority to and the benefit of U.S. Provisional Application No. 62/325,149 filed Apr. 20, 2016, the entire contents and substance of all of which are hereby incorporated by reference as if fully set forth below.

TECHNICAL FIELD

This invention relates processes for forming hydrogen mediated saline hydride initiated anionic polystyrene distributions via novel polymerization conditions in which molecular hydrogen is a chain transfer agent and a Highly Active Saline Hydride (HASH) or a Super Active Saline Hydride (SASH) forms an anionic polymer chain initiating species by addition of saline hydride to an anionically polymerizable hydrocarbon monomer; all of which takes place in a very efficient to highly efficient catalytic cycle where the kinetic chain length distribution is mediated by hydrogen or otherwise set by the relative feed rate of hydrogen to monomer. This invention also relates novel hydrocarbon soluble super active saline hydride catalyst and reagent compositions useful in conducting the hydrogen mediated saline hydride initiated polymerizations of this invention. This invention also relates novel low molecular weight polystyrene polymer composition formed exclusively from styrene and molecular hydrogen as the monomers.

BACKGROUND OF THE INVENTION

Low molecular weight–$M_w$<<4000 Daltons—polystyrene compositions are useful in a variety of applications both in their end use such as polymer slip reagents (see EPO 741147) or as substrate precursor's for further synthetic derivatization. Such synthetic derivatization generally conducted through aromatic electrophilic substitution reactions (see: U.S. Pat. No. 8,217,120B2 "Functionalized styrene oligomers and polymers"). Anionic chain transfer polymerization of polystyrene provides an economic benefit due to the cost-effective efficient use of the anionic chain transfer catalyst when forming low molecular weight polystyrene compositions due to the use of substantially reduced amounts of organolithium reagents and other alkali earth metal regents used in forming the chain transfer initiator and catalyst. Accordingly, methyl benzene compounds (toluene), polymethylbenzene compounds (xylenes, mesitylene, durene, etc.) are excellent chain transfer agents for forming low molecular weight polystyrene compositions suitable for further synthetic elaboration. Such methyl benzene chain transfer agents owe in part their effectiveness because the $pK_a$ of such compositions are generally at least one order of magnitude lower than that of a poly(styryl) anion's conjugate acid. Other alkyl substituted benzenes, ethylbenzene in particular, have been reported (EPO 741147) or at least suggested to be suitable organic chain transfer agents for forming anionic chain transfer styrene distributions using catalyst formed from potassium t-butoxide, butyllithium and TMEDA. Regardless of the method of forming an anionic chain transfer distribution, it is desirable to form low molecular weight polystyrene compositions free or essentially free of such organic chain transfer agents.

TABLE I

| Prior Art EPO 741147 Anionic Chain Transfer Styrene Polymerization w/Ethylbenzene as the Chain Transfer Agent | | | | | | | |
|---|---|---|---|---|---|---|---|
| EPO 741147 Example # | 1 | 2 | 3 | 4 | 5 | 6 | 7 |
| Cyclohexane Diluent (ml) | 0 | 1558 | 1558 | 1558 | 1558 | 1558 | 1558 |
| g Cyclohexane/g Styrene | 0 | 0.36 | 0.36 | 0.96 | 0.96 | 0.96 | 0.36 |
| Mole K:Mole Li | 1:1 | 1:1 | 1:1 | 1:1 | 1:1 | 1;1 | 1;1 |
| Mole Styrene/mole Ethylbenzene | 0.44 | 7.03 | 7.03 | 7.09 | 14.18 | 14.18 | 18.86 |
| Mole Styrene/hr/mole Ethylbenzene | 0.02 | 0.39 | 1.17 | 1.18 | 2.36 | 2.36 | 1.05 |
| Mole Styrene/hr/mole Lithium | 10.67 | 10.66 | 31.98 | 32.06 | 64.12 | 32.06 | 21.30 |
| $M_n$ | 164 | 876 | 1212 | 932 | 2137 | 1736 | 596 |
| $M_w$ | 262 | 19700 | 41800 | 1500 | 4830 | 3750 | 33300 |
| $M_z$ | NR | NR | NR | NR | NR | NR | NR |
| PD | 1.60 | 22.50 | 34.50 | 1.61 | 2.26 | 2.16 | 55.90 |
| Standard Deviation $\sigma_n = (M_w M_n - M_n^2)^{1/2}$ | 127 | 4060 | 7013 | 728 | 2399 | 1870 | 4414 |

From the experimental details of EP 0 741 147 A1, as presented in Table I above, it can be seen by comparison of EP 0 741 147 Examples 2-7 that only Example 4 produced an anionic chain transfer styrenic reaction polymer distribution (ACTSR distribution) having limited breadth (standard deviation) and small polydispersity. Minor changes in the relative feed rates or charges as reported, or both simultaneously, resulted in ACTSR distributions having very large standard deviations and having polydispersity that increase significantly, and in some Examples, astronomically. Thus, it can be seen that from such experimental details, a very narrow and limited process window for producing distributions with narrow breath, i.e., small standard deviation $\sigma_n$ is provided. Investigations of this prior art technology reveals that the process technology suffers from the undesirable formation of a catalyst composition of low or limited solubility in the hydrocarbon reaction medium. The process also relies on very slow relative feed rates conducted over long feed times (6 to 18 hours) in order to attempt to equilibrate living and dead polymer chains. The principle problem with ethylbenzene as a chain transfer agent is that the $pK_a$ of ethylbenzene is of the same order of magnitude as that the conjugate acid of a poly(styryl) anion. It is desirable to have a new catalyst and anionic chain transfer polymerization conditions that can provide lower molecular weight polystyrene distributions under more economical use of reagents as well as shorter time periods and thus more productivity of the polymerization reactor.

Polymerization of styrene under a hydrogen atmosphere is known for Zeigler Natta polymerization of styrene (Murahashi, S.; Nozakura, S.; and Utsuhara Y. "Polymerization of Styrene with the Ziegler-Natta Catalysts in the Presence of Molecular Hydrogen." *Bulletin of the Chemical Society of Japan* 1960 33 431). Additionally there is at least one report of for metallocene polymerization of styrene under a hydrogen atmosphere (Ref. 14: Tomotsu, N., Kuramoto, M., Takeuchi, M., & Maezawa, H. (1996). *Metallocenes* 1996, 96, 211. (i) Chien, J C W.; in Tomotsu, N., et al. "Syndiospecific Polymerization of Styrene." *Journal of Molecular Catalysis A: Chemical* 1998 128.1 167.). In both polymerization chemistries formation of the hydrogenation product of styrene-ethylbenzene—is mentioned. Thus Utsuhara and coworkers reported that isotactic polystyrenes of low molecular weight could be obtained in the presence of hydrogen, although in addition to this there was found another reaction which is competitive to the polymerization reaction, i. e. hydrogenation of styrene to ethylbenzene. In both approaches—Ziegler Natta and metallocenes catalysis—to hydrogen mediation of styrene polymerization ethylbenzene is kinetically inert and represents an unrecoverable yield loss.

Deffieux and coworkers report the hydrogenolysis of poly(styrl)lithium distributions (50° C. Hz 1 atm) leading to the in situ formation of lithium hydride capable of reinitiating styrene anionic polymerization at 100° C. (Ménoret, S., Deffieux, A., & Desbois, P. "Initiation of retarded styrene anionic polymerization using complexes of lithium hydride with organometallic compounds." Macromolecules, (2003) 36, 5988). Deffieux further reports that: "However, the slow addition of LiH to styrene with respect to propagation yields incomplete initiation." Deffieux reports that with addition of an added organometallic reagent (n,sec-Bu$_2$Mg, or BuMgOBT or i-Bu$_3$Al) the solubility and reinitiation efficiency of the LiH is improved but the catalyst efficiency is only between 50% and 150%. Furthermore the bimetallic complex formed decreases the rate of termination and the half-life of the active or living poly(styryl)lithium species is greatly increased from 40 min for uncomplexed poly(styryl) lithium to 34 hours for the bimetallic complexed poly(styryl) lithium at 50° C. in cyclohexane and 1.1 atm H$_2$. In fact they report that it requires 50 atms H$_2$ to restore the half-life of the living poly(styryl)lithium species to 50 minutes. Deffieux and co-workers teach that soluble lithium hydride is a potential initiator of styrene polymerization:

"Lithium hydride, as long as it remains soluble, is a potential initiator of styrene anionic polymerization, at least at 100° C., even in nonpolar solvent. The efficiency of this initiator is improved by complexation with organometallic derivatives which first ensure its solubility and then reduce the styrene propagation rate. When n,sec-Bu$_2$Mg is used as additive, Li—H bonds are not the real initiating sites, the polymerization proceeding after a ligand exchange between the two metal atoms."

"At high temperature, H$_2$ acts as a chain transfer agent in styrene anionic polymerization. However, to be efficient, its concentration in the medium should be high in order to shift the equilibrium toward the formation of metal hydride. This requires high hydrogen working pressures."

However Deffieux and coworkers require complexation of LiH with Lewis acids such as dialkylmagnesium reagents, aluminum akyls and/or alkylaluminum hydrides to solubilize the LiH. Such complexed LiH reagents thus formed are not efficiently reduced once used to polymerize styrene. Thus such Lewis acid complexed poly(styryl)lithium chains are not efficiently reduced nor do their reduction effectively regenerate a highly active or super active form of LiH initiator.

It is documented in the literature that only two highly soluble Group 1 metal hydrides free of Lewis acid complexing agents are known (see: Stasch, A. and Fohlmeister, L. *Aust. J. Chem.* 2015, 68, 1190-1201.; and Liptrot, D. J., *Springer Thesis: Group 2 Mediated Dehydrocoupling*, Chapter 2. *Group 1-Group 2 Bimetallic Alkyls and Hydrides*, Springer International Publishing, 2016, pp. 41-61). These are: (1) the "super aggregate" $[(t-BuOLi)_{16}(LiH)_{17}]$ generated via photolytic decomposition of a mixture of butyllithium lithium t-butoxide (Thomas, D. et.al., *J. Am. Chem Soc.* 1997, 119, 11998; and Thomas, D. et.al., *Angew. Chem. Int. Ed.* 1998, 37, 1537); and (2) Stash's hydrocarbon soluble LiH complex, $[(DipNPPh_2)_4Li_8H_4]$ (Dip, 2,6-iPr$_2$C$_6$H$_3$), prepared by the application of phenylsilane to a reactive metal precursor (Stasch, A. *Angew. Chem. Int. Ed.* 2012, 51, 1930.) However this hydrocarbon soluble LiH reagent is not reactive enough to hydrolithiate the very active species diphenylacetylene or 1,1-diphenylethylene. Thus one of ordinary skill in the art would understand that $[(DipNPPh_2)_4Li_8H_4]$ would not likely hydrolithiate a styrenic or other vinyl aromatic monomer and consequently would not initiate polymerization of such monomers. Stash also reports the formation of "initially clear solutions" of LiH/Li(pz) (pz=3,5-di-tert-butyl-1H-pyrazole) which turn milky likely due to formation of colloidal LiH. Such "initially clear solutions" are prepared by treating 3,5-di-tert-butyl-1H-pyrazole (pzH) with more than one equivalent of n-butyllithium in aromatic or aliphatic solvents, followed by addition of phenyl- or diphenylsilane to convert the excess alkyllithium groups to hydrides. Stash has prepared the first NaH complex $[(pz)_6Na_7H]$ by the same synthetic strategy as the LiH/Li(pz) methodology again using the sterically demanding pyrazolate ligand (pz) by the reaction of [Na (pz)], [Na(n-Bu)] and diphenylsilane in aromatic solvents. The application of the same synthetic strategy used to produce $[(pz)_6Na_7H]$ to form a KH hydride analogue resulted only in the formation of crystalline polymeric [K(pz)]. Thus a stable aliphatic and/or cycloaliphatic and/or aromatic hydrocarbon soluble monometallic, bimetallic or polymetallic alkali (Group 1) metal hydride formed directly from molecular hydrogen, H$_2$, is heretofore unknown.

In their publication (Stasch, A. and Fohlmeister, L. *Aust. J. Chem.* 2015, 68, 1190-1201) teach the following:

"Well-defined hydride complexes purely of Group 1 metals are very rare and are in fact only known for lithium and sodium so far . . . . Most isolated compounds involving alkali metals and hydridic hydrogen centres are mixed-element systems and are best described as 'ate'-type complexes in which the strongest interaction of the hydride ligand is with the non-alkali metal centre or metalloid . . . . This makes the majority of these 'ate' complexes covalent hydride complexes. The most prominent examples in this compound class are perhaps LiAlH$_4$, NaBH$_4$, and other related commercial derivatives such as L-Selectride®, N-Selectride®, and K-Selectride® (lithium, sodium, potassium tri-sec-butyl(hydrido)borate), or derivatives with sterically demanding ligands." emphasis added.

In contrast to covalent hydrides, saline, or ionic, hydrides are defined by the presence of hydrogen as a negatively charged ion, H$^-$, in combination with an alkali metal or alkaline earth metal. With regard to the addition of other saline hydrides to styrene with concomitant polymerization Deffieux and coworkers provide the following background (ibid):

"To the best of our knowledge, very few papers deal with anionic polymerization of vinylic monomers initiated by metal hydrides. Williams briefly mentioned one styrene polymerization experiment initiated by NaH in hexane at 25° C. However, the initiation efficiency was very low and the conversion reached only 90% after 3 days."

Liao and coworkers reported a form of highly active alkali metal hydrides having nanometric ($\approx$20 nm) particle size distributions (Liao, S.; et.al. *Journal of Molecular Catalysis*, 1993, 84, 211.) In this paper Liao reports formation of highly active saline hydrides (HASH) from the corresponding alkali metal and hydrogen (1 atm) in THF (40° C.) catalyzed by TiCl$_4$ and naphthalene. Complete conversion to the saline hydride required 2 hours for LiH*, 4 hours NaH* and 28 hours for KH* (the * denoting highly active or super active hydride). These nanometric saline hydrides were found to have some utility in the dechlorination and debromination of certain arylhalides. They were also reported to be active as co-catalyst for the hydrogenation of olefins such as 1-hexene when used in certain transition metal complexes. Turnover frequencies in the range of 0.003 to 45.3 s$^{-1}$ were reported. Thus highly active alkali metal hydrides (50-300 mol) when used in conjunction of a transition metal catalyst (1 mol) only reduce olefins, no disclosure of polymerization or even dimerization of the olefin is made.

Other applications of nanometric size alkali metal hydrides were later reported by Liao and coworkers (Liao, S.; et.al. *Synth. Comm.* 1997, 27 3977.) Such applications include the reduction of carbonyl carbon to aldehydes and/or alcohols of benzaldehyde, methyl benzoate, acrolein and the methyl and n-butyl ester of acrylic acid. The reactions were conducted in refluxing THF using a stoichiometric excess of highly active saline hydride—either as NaH* or as KaH*—and reactions times of 0.25 to 15 hours. Of particular interest are the reduction of acrolein (0.3 hour) and methyl acrylate (0.25 hour) with NaH* to yield allyl alcohol in 97% and 96% yield respectively. In another publication Liao and coworkers report that heat treated nanometric LiH, NaH and KH complexed with Cp$_2$TiCl$_2$, CP$_2$TiCl$_2$-MH (M=Li, Na or K), can be used as a catalyst to hydrogenate either styrene (M=Li or Na) or octene (M=K). Nanometric KH with Cp$_2$TiCl$_2$ under one atmosphere H$_2$ did not hydrogenate styrene instead initiated polymerization to form very high molecular weight (MW) polystyrene (M$_w$=200,000) with a wide range of melting points T=160-180° C. It was further found that nanometric KH alone polymerized styrene, one of ordinary skill in the art would understand that such high MW anionic polystyrene (APS) compositions are the result of inefficient initiation of polymerization thus resulting in formation of only very few living polymer chains which rapidly incorporate the styrene monomer at the expense of the remaining insoluble nanometric KH.

Zhang and co-workers report highly active catalysts for the hydrogenation of styrene (2 ml) in toluene (9 ml) under hydrogen atmosphere at −17° C. to 42° C. (Zhang, M.; et.al. *Catal Lett* 2008, 124, 146.). The highly active catalyst was formed from nanometric sized sodium hydride (20 mg, 8.7×10$^{-4}$) and 12 different Lewis base free titanocene complexes (0.5 mL of 4×10$^{-4}$ mol/L i.e. 2×10$^{-7}$ mol)–NaH*/Ti=4350). Uptake of hydrogen was not observed in two other examples where the titanocene complex contained a coordinating oxygen (ether) or nitrogen (tertiary amine) species. Despite the large excess of NaH* to the titanocene catalyst, no report or even mention is made of the polymerization of styrene much less any form of chain transfer chemistry.

The preparation of super active—extremely finely divided—forms of lithium, sodium and potassium hydrides were reported by Schleyer and co-workers (Schleyer, P. v. R.; et.al. *J. Org. Chem.* 1987. 52, 4299; and Schleyer, P. v. R.; et.al. *Angew Chem Int. Ed. Engl.* 1986 25 465.) The preparation of these super active saline hydrides (SASH) as a fine suspension entailed the hydrogenation of the corresponding alkali metal alkyls in the presence of N,N,N',N'-tetramethylethylenediamine (TMEDA) in hexanes. Formation of super active LiH* was conducted between 30 and 35° C., super active NaH* was prepared under cryogenic conditions (−10° C. to −15° C.), and super active KH* was reported to be formed at −20° C. to −25° C. The application of the hydrides to organic synthesis was explored by Schleyer and reported in the above cited open literature papers. Most of the synthetic reactions (metalations, additions and reductions) were conducted under cryogenic conditions with temperatures as low as −90° C. with a few reactions conducted between room temperature and 50° C. There were also no disclosures in Schleyer to use the hydrides for polymerization of styrenic, vinyl aromatic or conjugated diene monomers much less hydrogen mediation of such polymerization processes.

Harder and coworkers have reported that styrene can be catalytically hydrogenated (20° C., 20 atmospheres H$_2$, 15 hours in benzene) with 2.5 mole % of the organocalcium catalyst, [DIPPnacnacCaH·THF]$_2$ initially formed from phenylsilane, (see. Harder, S., Speilman, J., Buch, F. *Angew. Chem.* 2008, 120, 9576 also published as *Angew. Chem. Int. Ed.* 2008, 47, 9434.) The hydrogenation produced ethylbenzene in 85% yield along with a 15% yield of oligomers comprised mostly of styrene dimer with traces of styrene trimers and oligomers. Harder further reports 1,1-diphenylethene is reduced at a low conversion to yield 14% Ph$_2$CHCH$_3$ and 7% dimer in a catalyst formed from 5 mole % butyllithium/TMEDA complex at 20° C., 20 atmospheres H$_2$, 15 hours in benzene. With regard to this reaction the authors make the following statement:

"The reaction catalyzed by commercially available nBuLi/TMEDA proceeded only to low conversion . . . suggesting that, at lower H$_2$ pressures, the heavier alkaline-earth metal complexes are the more efficient catalysts."

Tetrahydrofuran soluble forms of magnesium hydride were produced by Ashby and coworkers from ortho-substituted (2,6-dimethyl- and 2,6-di-isopropylphenoxides) aryloxymagnesium reagents and an active form of solid magnesium hydride. Tetrahydrofuran insoluble forms of magnesium hydride resulted from alkoxymagnesium reagents and the solid magnesium hydride reagent (see Ashbey, E. C., Goel, A. B., Lin, J. J. *Tetrahedron Letters*, 1977, 3133.) Ashby also reported the formation of tetrahydrofuran soluble dialkylaminomagnesium hydrides a series of bulky dialkyl and alkylsubstituted cycloalkyl secondary amines and an active form of solid magnesium hydride. Said active form of magnesium hydride was prepared by the reduction of dimethylmagnesium with LiAlH$_4$ in diethyl ether. Thus the bulky dialkyl and alkylsubstituted cycloalkyl secondary amines are reacted with dimethylmagnesium to form the bis(dialkylamino)magnesium compounds which were in turn reacted in THF with the active form of magnesium hydride (see Ashbey, E. C., Goel, A. B., Lin, J. J. *J. Or. Chem.*, 1978, 43, 1564. Such aminomagnesium hydrides are likely to initiate polymerization by the addition of amide to the monomer and result in undesired amine functionality in the resulting polymer distribution.

Michalczyk report the formation in ethereal or hydrocarbon solvents in the presence of "appropriate ligands" the formation of a precipitated form of magnesium hydride MgH$_2$L$_x$. Such appropriate ligands included tetrahydrofuran, ethylene glycol dimethyl ether, and TMEDA. The reducing agent employed was phenylsilane (see Michalczyk, M. J. *Organometallics*, 1992, 11, 2307). In a recent review entitled "Molecular Early Main Group Metal Hydrides: Synthetic Challenge, Structures and Applications" Harder reviews the state of the art of the controlled synthesis of well-defined Group 1 and Group 2 metal hydrides. In general such hydrides have been prepared by the methods outlined above which include: photo-degradation; reactions of active hydrides to form "ate-complexes" such as the aryloxymagnesium hydride as well as the dialkylaminomagnesium hydrides reported by Ashby; Harder's [DIPPnacnacCaH·THF]$_2$ initially formed from phenylsilane; and Stach's soluble lithium hydride complex formed from phenylsilane. Additionally Harder reviews a host of hydrides formed from the thermal decomposition of magnesite complexes [(iPr$_2$N)$_3$Mg$^-$]M$^+$ (M$^+$=Na$^+$, K$^+$). A common feature of all approaches to forming soluble saline hydride compositions is the use of bulky (usually isopropylated ligands) to achieve solubility. In all cases except for the poorly catalytic species formed during the hydrogenation of styrene to ethylbenzene (85% yield) such as the example using [DIPPnacnacCaH·THF]$_2$ (which again was initially formed from phenylsilane) the saline hydride complexes were formed from some other reagent other than molecular hydrogen. Only Scheyer's insoluble forms of super active saline hydrides (SASH) are formed from molecular hydrogen and as the initial reagent.

Accordingly, the prior art does not disclose the use of either a highly active saline hydride (HASH) or a super active saline hydride (SASH) species for anionic-chain transfer polymerization of vinyl heteroaromatic monomers and/or vinyl aromatic monomers such as a styrenic monomers and/or conjugated diene monomers or other olefinic hydrocarbon anionically polymerizable monomers. The inventor has discovered that the use of these hydrides can catalyze a hydrogen mediated saline hydride initiated polymerization (HMSHIP) process. This invention provides a process for the efficient anionic chain transfer polymerization of vinyl aromatic monomers under ambient temperatures (e.g., about 20° C. to 100° C.) where hydrogen is the principal or sole chain transfer agent. Said process can be conducted at relatively low to very low hydrogen pressures partial pressures. Furthermore the inventor has discovered that the novel polymerization catalysts of this invention provide low molecular weight anionically polymerized styrene distributions comprised solely of styrene.

Numerical Terms

The efficiency (Eff$_{CT}$) of an anionic chain transfer process is given by the expression:

$Eff_{CT} = M_{n\ Th}/M_{n\ exp}$;

where $M_{n\ Th}$ the theoretical number average molecular weight, and the term $M_{n\ exp}$ is the number average molecular weight obtained in the actual run or process.

A brief resume of parameters used to describe molecular weight distributions and the equations that define them are presented in Table 2. (A. Rudin, *The Elements of Polymer Science and Engineering*, Academic Press, Orlando, 1982, pp. 54-58). The number average DP (DP$_n$) is calculated using M$_n$ as 100% polystyrene compositions.

TABLE 2

| Parameter | Equation |
| --- | --- |
| DP$_n$, Number average degree of polymerization | DP$_n$ = (M$_n$ − 2)/104 (for a polystyrene distribution) |
| M$_n$, Number average molecular weight | M$_n$ = (Σ M$_i$n$_i$) |
| M$_w$, Weight average molecular weight | M$_w$ = [(Σ M$_i^2$n$_i$)/M$_n$] |
| M$_z$, z-Average molecular weight | M$_z$ = (Σ M$_i^3$n$_i$)/ΣM$_i^2$n$_i$ |
| PD, Polydispersity Index (also PDI) | PD = (Σ M$_i$n$_i$)/[(Σ M$_i^2$n$_i$)/M$_n$] |
| Variance | V = (M$_w$M$_n$ − M$_n^2$) |
| Standard Deviation, σ$_n$ | σ$_n$ = √(M$_w$M$_n$ − M$_n^2$) |
| Skewness, $_n$U$_3$ | $_n$U$_3$ = M$_z$M$_w$M$_n$ − 3M$_n^2$M$_w$ + 2M$_n^3$ |
| Asymmetry, $_n$α$_3$ | $_n$α$_3$ = (M$_z$M$_w$M$_n$ − 3M$_n^2$M$_w$ + 2M$_n^3$)/σ$_n^3$ |

SUMMARY OF THIS INVENTION

The hydrogen mediated saline hydride initiated polymerization (HMSHIP) processes of this invention feature: a) the novel ability of soluble saline hydride species to add rapidly to a vinyl aromatic or a conjugated diene monomer to form an initiating species; b) the novel high efficiency in which the addition of the saline hydride species to monomer takes place and thus allows competition between the re-initiation step to compete with the propagation reaction step to grow the active transient living poly(styryl) anion chains thus maintaining a constant number of active growing chains; and c) the capacity of chain transfer from hydrogen under the mild and novel process conditions to terminate such living poly(styryl) anionic species and regenerate the saline hydride in a form capable of effectively reinitiating the polymerization process. Without such features the chemical process would otherwise either produce mainly reduced monomer on one extreme or high molecular weight polymer at the other.

The present invention relates to a process for anionic chain transfer polymerization comprising feeding vinyl heteroaromatic monomers and/or vinyl aromatic monomers, preferably a styrenic monomer, and/or conjugated diene monomer under an atmosphere comprising molecular hydrogen to a reactor vessel containing a reaction mixture of an inert ethereal solvent and an alkali metal or alkali metal alloy.

The present invention also relates to a process for anionic chain transfer polymerization comprising feeding vinyl aromatic monomer, preferably a styrenic monomer, and/or conjugated diene monomer under an atmosphere comprising molecular hydrogen to a reaction mixture in a reactor vessel, wherein said reaction mixture was formed from (a) an organolithium compound; (b) a polytertiaryamine compound; (c) a metal alkoxide, wherein said alkoxide is one or more alkali metal alkoxide, or a magnesium alkoxide; (d) optionally an aromatic hydrocarbon having at least one C—H covalent bond pK$_a$ within the range of 2.75 pK$_a$ units above that of the $pK_a$ of toluene to $-4.30$ $pK_a$ units below the $pK_a$ of toluene; and (e) a hydrocarbon solvent having a $pK_a$ greater than $H_2$.

The present invention also relates to a hydrocarbon soluble monometallic, bimetallic or polymetallic SASH catalyst composition formed from a reaction medium comprising: (a) molecular hydrogen; (b) an organolithium compound and/or an organomagnesium compound; (c) a polytertiaryamine compound; (d) an alkoxide, wherein said alkoxide is one or more alkali metal alkoxide(s), or a magnesium alkoxide (e optionally an aromatic hydrocarbon having at least one C—H covalent bond $pK_a$ within the range of 2.75 $pK_a$ units above that of the $pK_a$ of toluene to $-4.30$ $pK_a$ units below the $pK_a$ of toluene; and (f) a hydrocarbon solvent; wherein the aromatic hydrocarbon and hydrocarbon solvent may be the same or different.

DETAILED DESCRIPTION OF THE INVENTION

Glossary

It is to be understood and appreciated that the term "polymer" as used anywhere herein, including the claims, refers to the term "polymer" as defined in the context of the OECD definition of "polymer", which is as follows:

"A chemical substance consisting of molecules characterized by the sequence of one or more types of monomer units and comprising a simple weight majority of molecules containing at least three monomer units which are covalently bound to at least one other monomer unit or other reactant and which consists of less than a simple weight majority of molecules of the same molecular weight. Such molecules must be distributed over a range of molecular weights wherein differences in the molecular weight are primarily attributable to differences in the number of monomer units."

The terms "organolithium (active)" and "active organolithium" (abbreviated as Li active) means the amount of organolithium compound charged above the amount of organolithium compound needed to titrate any protic reagent as well as any protic impurity species such as water, and/or alcohol and/or a primary or secondary amine. Though we wish not to be bound by theory it is considered to be that the molar amount of active organolithium is equal to the molar amount of saline hydride formed on a 1:1 basis.

Protic when in combination with the term species, or reagent, or solvent or impurity means a chemical species having a covalently bonded proton (H$^+$) with a $pK_a$ below that of $H_2$ under the conditions of the chemical processes of this invention (see Buncel, E., Menon, B J. Am. Chem. Soc., 1977, 99, 4457: "Carbanion mechanisms. 6. Metalation of Arylmethanes by Potassium Hydride/18-Crown-6 Ether in Tetrahydrofuran and the Acidity of Hydrogen").

"HASH" means a Highly Active Saline Hydride formed from an alkali metal or alkali metal alloy in an ethereal solvent under an atmosphere comprising molecular hydrogen.

"SASH" means a Super Active Saline Hydride formed from (a) molecular hydrogen; (b) an organolithium compound; (c) a polytertiaryamine compound; (d) an alkoxide, wherein said alkoxide is an alkali metal alkoxide, or a magnesium alkoxide; (e) optionally an aromatic hydrocarbon having at least one C—H covalent bond $pK_a$ within the range of 2.75 $pK_a$ units above that of the $pK_a$ of toluene to $-4.30$ $pK_a$ units below the $pK_a$ of toluene; and in (f) a hydrocarbon solvent; wherein the aromatic hydrocarbon and hydrocarbon solvent may be the same or different (the reference $pK_a$ of toluene is that of the methyl protons i.e. one of the hydrogen atoms of the carbon hydrogen (—CH$_3$) bonds, and not that of the ring protons nor any secondary ionization. See in this connection Gau, G. Marques, S. J. Am. Chem. Soc., 1976, 98, 1538: "Acidities of Alkylarenes from the Equilibriums of their Sodium Salts").

The term "molecular hydrogen" means $H_2$ as $^1H_2$ but can also include the isotopes of hydrogen $^2H_2$ or $^3H_2$ either as mixtures of the isotopes or enriched in a particular isotope whether in the gas state in the vapor space or dissolved in the condensed phase.

The term "diene" (or diolefin) means an unsaturated hydrocarbon that contains two carbon double bonds. A conjugated diene is a diene where the two double bonds are separated by a single bond and hence have overlapping and shared molecular orbitals.

The term "inert ethereal solvent" means a solvent comprising at least one ether solvent which does not react with alkali metal and/or the catalyst and/or any reactive intermediate(s) derived therefrom in such a manner that the ethereal solvent is degraded or converted into another reagent deleterious to the chemistry or process. However the inert ethereal solvent may act as a Lewis base and hence form a complex with the alkali metal and/or the catalyst and/or any reactive intermediate(s) derived therefrom.

The term "alkali metal alloy" means a metal alloy of at least two metals wherein at least one of which is an alkali metal however such an alkali metal alloy can be comprised of two alkali metals such as NaK or NaK$_2$ and may have such alkali metals dissolved or in some physical combination with the alloy.

The term "electron transfer entraining agent" is a neutral organic molecule such as but not limited to naphthalene or biphenyl which readily undergoes reduction via single electron transfer from the alkali metal or alkali metal alloy forming a radical anion and then in turn can transfer the electron to a polymerizable monomer such as styrene and thereby is re-oxidize to the neutral organic molecule.

The term "and/or" means singular or a combination. For example, "A and/or B" means "A" alone, "B" alone, or a combination of A and B.

The term "with or without" means singular or in combination. For example A with or without B means "A" alone or a combination of A and B.

The term "organolithium compound" means an organic group bonded to a lithium atom. Non-limiting examples of organic groups may be aliphatic (e.g., an alkyl group), cycloaliphatic (e.g., cycloalkyl), vinyl group, allylic group, benzylic group, an aromatic group (e.g., phenyl) or a polystyryllithium.

The "term polytertiaryamine promoter" means a compound containing at least two tertiary amine groups that promotes or activates the formation of the hydride catalyst during the HMSHIP process. Non-limiting generic formulae for such polytertiaryamines would include:

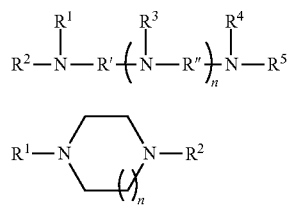

-continued

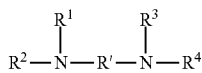

where R' and R" are independently organic groups capable of forming bonds with two or more amines and $R^1$, $R^2$, $R^3$, $R^4$, and $R^5$ are independently organic groups which may also be further substituted by other tertiary amines, and the index value n is independently a whole number equal to or greater than 0 (i.e. n=0, 1, 2, 3 . . . ). It should be understood that when n=0 than the group within the parentheses does not exist and the structure is intended to mean that the chemical bond is between the two groups that intersect the two sides of the parentheses. Thus polyteriary amine structure 2 becomes structure 4 when n=0.

The term "alkali or alkaline earth metal alkoxide" means an alkoxide with the generic formula MOR, where M is an alkali metal, or magnesium or calcium metal, O is oxygen and R is an organic group such as alkyl, cycloalkyl. benzyl or aromatic group. They are typically formed by the reaction of the metal, metal hydride or metal alkyl with a compound containing an alcohol group. For the purpose of distinction catalyst forms an "alkali metal alkoxide" does not contain an ether or tertiary amine moiety as a part of a functional group in its chemical structure. Catalysts formed from these reagents have distinctly different solubility's, reactivity's and selectivity's and thus should in no way be equated.

DESCRIPTION

The present invention relates a process of conducting hydrogen mediated saline hydride initiated polymerizations (HMSHIP) of anionically polymerizable hydrocarbon monomers, catalyst compositions for conducting such a process and under certain preferred conditions the formation of novel and beneficial low molecular weight anionic chain transfer polymer distributions. The process features feeding at least one anionically polymerizable hydrocarbon monomer to a suitable solvent containing an active and generally soluble saline hydride catalyst under an atmosphere comprising molecular hydrogen wherein chain transfer from molecular hydrogen is a significant component of the mechanism that determines the kinetic chain length (v) distribution and hence the number average molecular weight ($M_n$) of the resulting product distribution.

The present invention also relates a process of conducting hydrogen mediated saline hydride initiated polymerizations which features feeding at least one anionically polymerizable vinyl heteroaromatic monomer to a suitable solvent containing an active and generally soluble saline hydride catalyst under an atmosphere comprising molecular hydrogen wherein chain transfer from molecular hydrogen is a significant component of the mechanism that determines the kinetic chain length (v) distribution and hence the number average molecular weight (Mn) of the resulting product distribution.

One embodiment of the present invention relates to a process for anionic polymerization of vinyl aromatic monomers such as a styrenic monomer (i.e., styrene) using active saline hydrides. A general, non-limiting, representation of a styrene polymer mechanism is shown below. In this general representation of the anionic polymerization process, MH* denotes an activated form of a saline hydride for the saline hydride metal in HASH or SASH. The terms $k_{MH^*}$, $k_i$, $k_p$, and $k_r$, represent the rate constants for MHI* addition, chain initiation, chain propagation and reductive chain transfer steps respectively, Saline hydrides—also called ionic hydrides—include hydrides of alkali metals and alkaline earth metals. Thus M can be or include one or more of lithium, sodium, potassium, rubidium, cesium, magnesium or calcium.

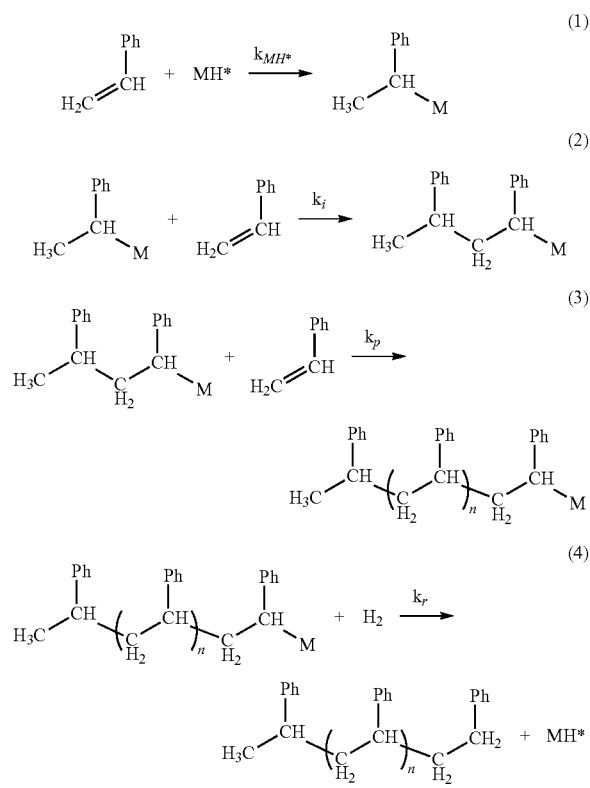

Under the conditions of this novel anionic chain transfer polymerization reaction either a HASH or a SASH catalyst is used in the reduction of an active or living poly(styryl) anion by molecular hydrogen. This reductive chain transfer yields a discrete dead polystyrene chain and regenerates the active catalyst species. Repetition of the process through many catalytic cycles of the 4 steps: 1) MH* addition to styrene; 2) polymer chain initiation forming a mono-adduct; 3) polymer chain propagation and 4) chain transfer to form a discrete dead polymer chain; provides an anionic chain transfer polystyrene distribution of dead polymer chains of characteristic molecular weights ($M_n$, $M_w$, and $M_z$), polydispersity index, standard deviation and asymmetry. The processes of this invention are highly efficient with catalyst efficiencies typically in the range

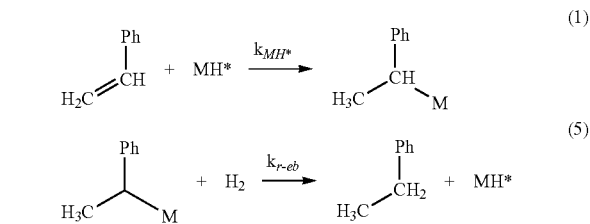

-continued

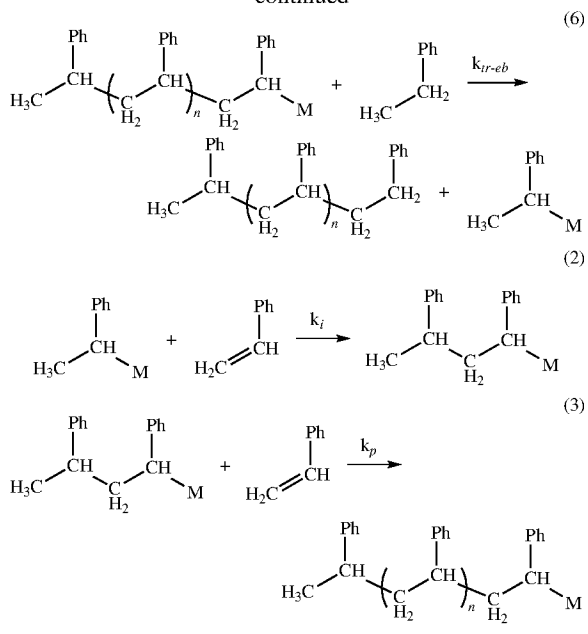

(6)

(2)

(3)

The use of the optional aromatic hydrocarbon and its incorporation into the resulting polymer distribution is outlined in the chemical equations [i.e. the sequence beginning with (6) followed by (2) and completed by (3)] above. The equations below use the non-limiting examples of styrene for the monomer and ethylbenzene for the aromatic hydrocarbon. It should be understood that with or without ethylbenzene present from the start, a portion of styrene is reduced to ethylbenzene during the course of an HMSHIP process when styrene is the monomer. However the ethylbenzene formed can be kinetically active and can reenter the chain transfer chemistry when the HMSHIP process is conducted above about 50° C. Under such conditions the hydrogenated styrenic monomer (ethylbenzene) can be kinetically active as a chain transfer agent forming the identical and indistinguishable anionic chemical species as is formed when in this example MH* is added to the styrenic monomer when that monomer is styrene.

If one or more other chain transfer agents are used as the solvent(s) then a portion of the distribution of dead polymer chains may have incorporated the added chain transfer agent(s) (depending on the relative $pK_a$ of the chain transfer agent and the nature of the saline hydride catalyst). For a process where the recovered styrenic monomer reduction products are recycled directly back to the process, the product distribution of dead polymer chains is comprised solely of a collection of discrete styrenic polymer chains having an initiating hydride and a terminating proton derived from molecular hydrogen.

Because one key feature of this invention is the highly efficient addition of a HASH or SASH to styrene or other styrenic monomers and subsequent rapid initiation (chemical equations 1 and 2), the number average molecular weight distribution $M_n$ of polymer distributions producible by this invention can be expressed in terms of a kinetic chain length ($\upsilon$). The number average degree of polymerization $\overline{DP}_n=\psi$ and is given by the ratio of the rate of the reactions that make the polymer grow divided by the rate of the reactions that stop growth. Though we wish not to be bound by theory $\overline{DP}_n$ can be expressed in terms of the chain transfer constant $C_{r_{Hsty^{(-)}}}$ for the reduction of the polymer initiation species (i.e. is the addition product of the saline hydride to the monomer denoted as Hsty$^{(-)}$) and both the chain transfer involving hydrogen $$\left(C_{tr_{H_2}}\right)$$

and chain transfer involving ethylbenzene ($C_{tr_{EB}}$). The kinetic chain length ($\upsilon$) is expressed for certain embodiments of this invention by Equation (IV) below. From Equation (IV) at increased styrene concentrations [sty] (faster styrene feed rates) and reduced $H_2$ concentration [$H_2$] (reduced partial pressure or mass transfer) and reduced ethylbenzene concentration [EB], the kinetic chain length u becomes large. Conversely at decreased styrene concentrations (via slower styrene feed) and increased $H_2$ concentration (via increased partial pressure or mass transfer) and increased ethylbenzene concentration, the kinetic chain length u becomes small.

$$\overline{DP}_n = \frac{k_p[Hsty_n^-][sty]}{\left(k_{r_{EB}}[H_2][Hsty^{(-)}] + k_{tr_{H_2}}[H_2][Hsty_n^-] + k_{tr_{EB}}[EB][Hsty_n^-]\right)} \quad (I)$$

$$\psi^{-1} = (\overline{DP}_n)^{-1} = \frac{k_{r_{Hsty^{(-)}}}[H_2][Hsty^-] + k_{tr_{H_2}}[H_2][Hsty_n^-] + k_{tr_{EB}}[EB][Hsty_n^-]}{k_p[Hsty_n^-][sty]} \quad (II)$$

$$\psi^{-1} = \frac{k_{r_{Hsty^{(-)}}}[H_2][Hsty^-]}{k_p[Hsty_n^-][sty]} + \frac{k_{tr_{H_2}}[H_2] + k_{tr_{EB}}[EB]}{k_p[sty]} \quad (III)$$

$$\psi^{-1} = C_{r_{Hsty^{(-)}}}\frac{[H_2][Hsty^-]}{[Hsty_n^-][sty]} + C_{tr_{H_2}}\frac{[H_2]}{[sty]} + C_{tr_{EB}}\frac{[EB]}{[sty]} \quad (IV)$$

Further Detailed Description of this Invention

The anionically polymerizable hydrocarbon monomers can include one or more vinyl aromatic monomers especially styrenic monomers, conjugated diene monomers and olefin monomers. Preferably, the vinyl aromatic monomer is a styrenic monomer such as styrene, or alkylated styrene monomers such as such as the o- m-, and p-, isomers of methyl styrene, p-isopropylstyrene, 2,4-diethylstyrene, o-ethylstyrene, 3,5-di-isobutylstyrene, 2,6-dimethyl styrene, 2-ethyl-4-methylstyrene and combinations thereof. For forming linear polymeric microstructures free of branching molecular architectures, styrene is the preferred vinyl aromatic monomer. Alkylated styrene monomers under the process conditions will themselves behave as chain transfer agents and result in some degree of branching and potential cross linking. Divinyl aromatic monomers such as divinylbenzene can also be used as co-monomers however branching and crosslinking can occur.

Non-limiting examples of conjugated diene monomers are 1,3-butadiene, isoprene, 1,3-pentadiene, 2,3-dimethyl-1,3-butadiene and 1,3-hexadiene.

Non-limiting examples of olefin monomers can include ethylene, propene, butene, pentene, hexene, octene and the like as well as a non-conjugated di-olefin such as 4-vinyl-1-cyclohexene. Such olefinic monomers form telomer distributions under the HMSHIP process conditions.

One embodiment of the present application relates to a process for hydrogen mediated anionic chain transfer polymerization (hereinafter: HASH catalyst process) comprising feeding a styrenic monomer and/or other vinyl aromatic monomer and/or conjugated diene monomer under an atmosphere comprising molecular hydrogen to a reactor vessel containing a reaction mixture of an inert ethereal solvent and an alkali metal or alkali metal alloy ideally as a suspended dispersion. The product of which when the monomer is solely styrene is designated as a HASH PS distribution.

Non-liming examples of inert ethereal solvent are tetrahydrofuran, cyclopentyl methyl ether, di-tert-butyl ether, diethyl ether, diethylene glycol diethyl ether, diglyme, dimethoxyethane, 1,4-dioxane, ethyl tert-butyl ether, methoxyethane, methyl tert-butyl ether, 2-methyltetrahydrofuran, and tetrahydropyran.

Non-limiting and preferred examples of alkali metal and/or mixtures of alkali metals and/or alkali metal alloys as dispersions of lithium, and/or sodium, and/or potassium, and/or rubidium and/or cesium; and dispersions formed from sodium potassium alloys such as NaK and/or $NaK_2$.

One embodiment of the HASH catalyst process is where the styrenic monomer is styrene, the ethereal solvent is tetrahydrofuran and the sodium potassium alloy is $NaK_2$. In addition, the partial pressure of hydrogen is maintained at pressures between about 2.5 Bar to about 10 Bar The HASH catalyst process above may also contain in the reaction mixture an electron transfer entraining agent. Non-liming examples of electron transfer entraining agent are biphenyl, naphthalene, or other preferably unsubstituted—to avoid incorporation in the polymer composition—conjugated aromatic hydrocarbons, or fused ring aromatic hydrocarbons.

In one embodiment of the present application, the ethereal solvent and alkali metal or alkali metal alloy are initially charged into the reactor vessel and agitated using high shear high speed mixing (high shear impeller with tip speed>15 ft/s or 4.5 meter/s) to create and maintain an alkali metal or metal alloy dispersion for as long as metallic ($Li^0$, $Na^0$, $K^0$, $Cs^0$) alkali metal is present and at a temperature above its melting point.

The partial pressure of hydrogen employed in the above HASH catalyst process is maintained at pressures between about 1.0 to about 20.0 Bar, or about 1.5 to about 12.0 bar, or about 2.5 to about 10.0 Bar or about 3.0 to about 7.0 Bar The molar ratio amount of alkali metal or alkali metal alloy to styrenic and/or conjugated diene monomer may range of about 1:10 to about 1:100 or about 1:15 to about 1:50.

The temperature of the reaction mixture and/or process is maintained in the range of about 20° C. to about 100° C., and preferably in the range of about 40° C. to about 80° C.

As mentioned above, the agitation in the reactor vessel should be at least sufficient to maintain a substantially homogeneous concentration profile of the styrenic monomer in the inert ethereal solvent and to efficiently transport Hz from the gas or vapor phase to the condensed phase.

Additionally, it is desirable that when the alkali metal is potassium, sodium, or an alloy of potassium and sodium to employ high shear mixing to create and maintain a dispersion of the initially charged alkali metal at a temperature sufficiently high to melt the alkali metal or metal alloy if the metal or metal alloy is not already in a liquid state above its melting point.

Upon completion of the reaction, as indicated, for example, by rapid reduction in the process temperature at constant heat flux and/or the termination of uptake of Hz, the reaction mixture is placed under increased hydrogen pressure and then transferred to a wash reactor for quenching and water washing. The wash reactor may be previously charged with a high boiling solvent such as ethylbenzene with little or no water. To aid in recovery of solvent, it is preferred to distill the ethereal solvent prior to contacting the reaction mixture with water. The quench can be conducted at ambient temperatures and employs a minimum of a protic solvent such as isopropyl alcohol which is fed carefully with time to allow hydrogen to safely vent from the reactor. The product is water washed to remove alkali metal salts. The high boiling solvent may be separated and recovered from the washed reaction mixture, whereby the last traces of water are also removed azeotropically from the reaction mixture. This separation operation is continued until most of the solvent and the monomer reduction product (for styrene the reduction product is ethylbenzene) is removed. Alternatively the catalyst can be quenched in the polymerization reactor by slow addition of the protic quenching agent. Upon completion of the quench, the quenched reaction mixture is transferred to the wash reactor and the work up is as described above.

Another embodiment of the present application relates to a process for hydrogen mediated anionic chain transfer polymerization comprising feeding a styrenic monomer and/or other vinyl aromatic monomer and/or conjugated diene monomer under an atmosphere comprising molecular hydrogen to a reactor vessel containing reaction mixture of a hydrocarbon solvent and a hydrocarbon soluble saline hydride catalyst. The soluble saline hydride catalyst is a SASH catalyst Another embodiment of the present application relates to a process for anionic chain transfer polymerization comprising feeding vinyl aromatic monomer, preferably a styrenic monomer, and/or conjugated diene monomer under an atmosphere comprising molecular hydrogen to a reaction mixture in a reactor vessel, wherein said reaction mixture was formed from (a) an organolithium compound; (b) a polytertiaryamine compound; (c) a metal alkoxide, wherein said alkoxide is one or more alkali metal alkoxide, or a magnesium alkoxide; (d) optionally an aromatic hydrocarbon having at least one C—H covalent bond $pK_a$ within the range of 2.75 $pK_a$ units above that of the $pK_a$ of toluene to −4.30 $pK_a$ units below the $pK_a$ of toluene; and (e) a hydrocarbon solvent having a $pK_a$ greater than Hz. The aromatic hydrocarbon and hydrocarbon solvent may be the same or different.

The partial pressure of hydrogen may be maintained at pressures between about 1.0 Bar to about 19.0 Bar, or about 1.5 Bar to about 12.0 Bar, or about 2.5 Bar to about 10.0 Bar or about 3.0 Bar to about 7.0 Bar The temperature of the reaction mixture and/or process is maintained in the range of about 20° C. to about 130° C., more preferably in the range of about 40° C. to about 110° C. and most preferred in the 60° C. to 90° C.

Preferably, the alkoxide is potassium or sodium alkoxide. In addition, another embodiment is when the alkoxide is derived from t-butylalcohol [$(CH_3)_3COH$], t-pentylalcohol [$C_2H_5(CH_3)_2COH$] or 3-methyl-t-pentylalcohol [$CH_3(C_2H_5)_2COH$].

In further embodiments, the vinyl aromatic monomer is a styrenic monomer. The organolithium compound is n-butyllithium, sec-butyllithium, tert-butyllithium, iso-butyllithium, phenyllithium, 1-hexyl-1-phenyllithium, cyclohexyllithium or poly(styryl)lithium. The polytertiaryamine is N,N,N',N'-tetramethylethylenediamine (TMEDA). Also, The aromatic hydrocarbon may preferably be benzene, toluene, mesitylene, o-xylene, m-xylene, ethylbenzene, n-propylbenzene, n-butylbenzene, isobutylbenzene, amylbenzene, 1,3-diarylpropanes or a styrene dimer.

In the above process, the molar ratio of the alkoxide to organolithium compound charged in the reactor is in the range of about 0.25:1.0 to about 10:1; the molar ratio of styrene to organolithium compound is about 10:1 to about 1000:1, and the molar ratio of the tertiary amine to organolithium compound is in the range of about 1.5:1 to about 20:1 and the hourly feed rate of monomer to organolithium is in the range of 10 to 200 moles of monomer per hour per mole of organolithium.

More preferably in the above process, the vinyl aromatic monomer is styrene, the organolithium compound is a butyllithium, the polytertiaryamine is N,N,N',N'-tetramethylethylenediamine (TMEDA) and the hydrocarbon is ethylbenzene.

The soluble catalyst compositions are formed from (a) an organolithium compound; (b) a polytertiaryamine promoter compound; (c) a metal alkoxide, wherein said alkoxide is an alkali metal alkoxide, or a magnesium alkoxide; (d) optionally an aromatic hydrocarbon having at least one C—H covalent bond $pK_a$ within the range of 2.75 $pK_a$ units above that of the $pK_a$ of toluene to −4.30 $pK_a$ units below the $pK_a$ of toluene; and (e) a hydrocarbon solvent having a $pK_a$ greater than $H_2$, wherein the aromatic hydrocarbon and hydrocarbon solvent may be the same or different. The product distribution formed from such a process when the monomer is solely styrene hereinafter designated SASH PS distribution.

In the above catalytic composition, the alkoxide is preferably a potassium and/or sodium alkoxide. Also preferable is when the alkoxide is derived from t-butylalcohol [$(CH_3)_3COH$], t-pentylalcohol [$C_2H_5(CH_3)_2COH$] or 3-methyl-t-pentylalcohol [$CH_3(C_2H_5)_2COH$].

In another embodiment of the catalytic composition, the organolithium compound is preferably a n-butyllithium, sec-butyllithium, tert-butyllithium, iso-butyllithium, phenyllithium, 1-hexyl-1-phenyllithium, cyclohexyllithium or poly(styryllithium). I In yet another embodiment of the catalystic composition, the tertiary amine is preferably N,N,N',N'-tetramethylethylenediamine (TMEDA).

In the above catalytic composition, the aromatic hydrocarbon is preferably benzene, toluene, o-xylene, m-xylene, mesitylene, ethylbenzene, n-propylbenzene, n-butylbenzene, isobutylbenzene, amylbenzene, 1,3-diarylpropanes or styrene dimer.

Furthermore, in the above catalystic composition, the molar ratio of the alkoxide to organolithium compound is in the range of about 0.25:1 to 10:1; the molar ratio of the polytertiaryamine to organolithium compound is in the range of about 1.5:1 to about 20:1.0 and wherein the partial pressure of hydrogen is maintained at pressures between about 1.0 Bar to about 19 Bar.

In the practice of the invention a precursor to the SASH catalyst can be optionally formed and converted to the SASH catalyst in a variety of methods which are not limited by but include:
  I. forming a well-mixed solution of at least (a) and (b) in (e) under an inert atmosphere and then converted to SASH by: 1) feeding a portion of the monomer; 2) feeding (c) dissolved with (b) in (e) if not already introduced to the reactor; and 3) replacing or otherwise displacing the inert atmosphere with $H_2$; or
  II. forming a well-mixed solution or suspension of (a), (b), (c), and (d) in (e) under an inert atmosphere to form a precursor which is then converted to SASH by replacing or otherwise displacing the inert atmosphere with hydrogen; or
  III. forming a well-mixed solution of (b) and (c) in (e) under a hydrogen atmosphere; feeding a portion of the monomer then feeding (a) all at once; or
  IV. forming a well-mixed solution of (b), (c) and (d) in (e) under a hydrogen atmosphere then feeding (a) over a period greater than about 3 minutes.

Of these four modes of forming the SASH catalyst (i.e. methods I-IV above), method IV most consistently provides run to run reproducibility. The practice of method IV nearly eliminates the formation of suspended solids, as well as solids that adhere to hot surfaces (i.e. heated reactor walls) and solids that adhere to cold surfaces (i.e. cooling coils, baffles, dip-legs and agitator blades and shafts). Methods I and II are least desired in that these methods enhance the formation of solids and require purging or displacing the inert atmosphere. Method III can be used if no added chain transfer agent is desired for forming the product distribution. The drawback of method III is in order to avoid forming a high molecular weight impurity distribution; (a) must be added rapidly which produces a significant heat release that might be deemed undesirable in a commercial scale reactor. It should be understood that other modes or sequences of combining (a), (b), (c), (d) and (e) in the presence or prior to the introduction of molecular hydrogen along the addition of other reagents or solvents (such as quantities of THF as a Lewis base) can be practiced and are well within the scope of this invention.

It should be understood that in the practice of method IV for forming the SASH catalyst in order to conduct the SASH catalyst process, the molar ratios of the metal alkoxide:organolithium compound and polytertiaryamine:organolithium coumpounds mathematically varies over the range from the limit of ∞:1 from the first drop of the organolithium introduced to the final stoichiometric ratio based on the intended total charge of the active organolithium reagent. Thus it matters not or at least very little what the molar excess of either the metal alkoxide and/or the polytertiaryamine charge is while forming the SASH catalyst used in the practice of the processes of this invention—the catalyst forms with large molar excesses of these reagents. Thus the use of amounts of (a), (b) and (c) outside the preferred ranges of relative ratios of the total charges recited below, such use of such amounts is well within the scope of the present invention. Practice of this invention using catalyst component charge ratios outside the recited preferred ranges of such ratios may at best simply results in inefficient use of raw materials and may at worse provide compositions that interfere with the efficiency in which the SASH catalyst is produced and solubilized.

Non-limiting preferred examples of organolithium compounds suitable for forming SASH catalysts are n-butyllithium, sec-butyllithium, tert-butyllithium, iso-butyllithium, allyllithium, vinyllithium, phenyllithium, 1-hexyl-1-phenyllithium, 1-hexyl-1,1-diphenyllithium, cyclohexyllithium, and poly(styryl)lithium compounds which can be added or generated in situ.

Non-limiting examples of metal alkoxides used in forming a soluble SASH catalyst are those derived from t-butylalcohol [$(CH_3)_3COH$], t-pentylalcohol [$C_2H_5(CH_3)_2COH$] and 3-methyl-t-pentylalcohol [$CH_3(C_2H_5)_2COH$], such as potassium t-butoxide or sodium pentoxide. The alkoxides derived from potassium are preferred.

Non-limiting examples of poly(tertiary amine) promoters useful in SASH catalyst, applications include di(tertiary amine) ligands derived from propylene diamine, di(tertiary amine) ligands derived from ethylene diamine or from polyethylene imine. Preferred examples include N,N,N',N'-tetramethylethylenediamine (TMEDA), N,N,N',N''-pentamethyldiethylenetriamine (PMDETA), sparteine, isosparteine, and 1,4-methylpiperazine wherein TMEDA is most preferred. The most preferred poly(tertiary amine) promoter ligands are the most volatile and/or the most water and/or acid soluble compounds thus TMEDA is preferred.

The preferred aromatic hydrocarbon which may be used is any aromatic hydrocarbon having a $pK_a$ relative to toluene±2.75 $pK_a$ units however it is conceivable that an aromatic hydrocarbon such as diphenylmethane with a $pK_a$ of 4.32 units less than toluene can be employed so long as: 1) the incorporation of diphenylmethane moiety in the polymer microstructure does not affect the ultimate end use; and/or 2) the $pK_a$ of such hydrocarbons are suffiently above that of $H_2$ under the reaction conditions so as to not interfere with the hydrogen mediated chain transfer mechanism. Non-limiting examples of aromatic hydrocarbons that may be used are benzene, toluene, mesitylene, ethylbenzene, n-propylbenzene, n-butylbenzene, isobutylbenzene, amylbenzene, 1,2-darylethanes, 1,3-diarylpropanes, cumene, t-butylbenzene, a 1-alkyl naphthalene, 2-alylnaphthalene or a styrene dimer or low molecular weight oligomer distribution (styrene dimers, trimers, tetramers, pentamers, and hexamers). Though the use of such aromatic hydrocarbons is optional, their use is preferred in that it is believed their presence diminishes or preempts or otherwise mitigates the undesired attack of the organolithium more specifically an alkyllithium reagent on the polytertiaryamine promoter. Hydrocarbons that are easily removed from the product distribution by distillation or by polymer precipitation are preferred. The most preferred aromatic hydrocarbon for HMSHIP process utilizing styrene is ethylbenzene.

The hydrocarbon solvent which may be used in any hydrocarbon having a $pK_a$ greater than molecular hydrogen ($H_2$) under the reaction conditions. Non-limiting examples of such preferred solvents are cyclohexane, methyl cyclohexane, and the aromatic hydrocarbons listed above. Other hydrocarbon solvents can be used as long as their use does not affect the solubility of the saline hydride catalyst, reactive intermediates, transient living polymer chains and the polymer chain distribution product.

The aromatic hydrocarbon and the aromatic solvent may be the same or different. This means that the aromatic hydrocarbon can act as both the aromatic hydrocarbon and the solvent. For example, ethylbenzene is a preferred component in the polymerization of styrene and can be used as both the aromatic hydrocarbon and the solvent. In this case, for a SASH process components (d) and (e) would merge into one component (or limitation) and be the same. Likewise, they can be different. For example, the aromatic hydrocarbon may be ethylbenzene and the hydrocarbon may be cyclohexane. Thus components (d) and (e) would be different. Furthermore, component (d) may be optional if no aromatic hydrocarbon is used and, for example, cyclohexane is used as component (e).

The partial pressure of hydrogen in the above SASH catalyst processes is maintained at pressures between about 0.001 Bar to about 10.0 Bar, or about 0.3 Bar to about 6.8 Bar, or about 0.5 Bar to about 5.2 Bar or about 1.0 Bar to about 4.2 Bar. A hydrogen partial pressure greater than about 10.0 Bar is permissible for a period of time during the process when process conditions entail routine operation with adequate mixing to maintain hydrogen transfer to the condensed phase. However a substantial amount of time at such increased hydrogen partial pressures will generally result in hydrogenation of the monomer with a substantial reduction of polymer molecular weight and yield as is predicted by Equation IV that expresses kinetic chain length (v) in terms of hydrogen activity $[H_2]$. Conversely, hydrogen pressures below 0.1 Bar (less than 1.5 PSI) are permissible during routine operation of the processes involving potassium hydride forms of SASH catalyst. Under such conditions of low hydrogen partial pressure and hence low $H_2$ activity in the condensed phase, chain transfer from the organic chain transfer agents whether added or formed during the course of the run will compete more substantially. It is pointed out that the partial pressures recited above are only meaningful if adequate mass transfer of molecular hydrogen to the condensed phase is maintained such that the partial pressure reflects the condensed phase activity of molecular hydrogen—i.e. an effective and steady state mass transfer of $H_2$ to the condensed phase is established. Thus much higher $H_2$ partial pressures can be applied when mass transfer to the condensed phase is diminished due to poor mixing of the vapor phase with the condensed phase and thus results in poor mass transfer.

In that nitrogen may (though no evidence of this has been observed) potentially be "fixed" by—that is $N_2$ may be reduced by—the saline hydride catalyst of this invention and because as the reactor headspace volume is reduced by the monomer feed when operating under semi-batch conditions, it is potentially desirable but perhaps not necessary to eliminate or at least minimize $N_2$ from the reactor headspace and system. It is possible to operate with other gases present which are generally deemed inert toward activated hydrides such as a noble gas (He, Ne, Ar) or a relatively light aliphatic or cycloaliphatic hydrocarbon (hydrocarbon with boiling point close to or less than the reaction temperature). Of these inert gases the relatively light hydrocarbons are preferred because such hydrocarbons are generally soluble in the reaction medium and hence do not displace $H_2$ and thereby reduce the partial pressure of $H_2$ in significantly varying amounts during the course of the monomer feed at a constant reactor pressure. Thus inert gases that become compressed in the head space as the condensed phase volume increases are less desired. However the presence of such low solubility gases such as the noble gases in a continuous process where the headspace volume is fixed may perhaps be used to some benefit. It is difficult to operate a commercial reactor at low positive pressures of constant pressure thus it may be advantageous to have present low boiling (petroleum ethers) hydrocarbons such that a desired $H_2$ partial pressure and hence activity can be maintained at a higher overall reactor pressure. Such light hydrocarbons can even provide the added benefit of some means of refluxive cooling.

For the SASH process, the molar ratio amount of the metal alkoxide:organolithium (active) compound is 1:3 to about 3:1, or about 0.66:1 to about 1.33:1, or about 0.7:1 to about 1:1. The practitioner can use a ratio of metal alkoxide:organolithium (active) outside of the preferred range so long as the added excess reagents do not interfere with forming the soluble SASH catalyst. A slight molar excess (e.g. up to about 30% excess) of the initially charged organolithium compound appears to improve the resulting SASH catalyst solubility in aromatic hydrocarbons. The use of metal alkoxide:organolithium much above or below ratio of [1:1] generally requires an increase in the charge of the polytertiaryamine. Significantly higher ratios where the organolithium is in a large excess runs the risk of forming the less soluble lithium form of the SASH catalyst (i.e. nanometric lithium hydride particles of very low solubility and activity in the SASH catalyst process see Examples 42 and 43 below). Though permissible conditions that lead to formation of such nanometric lithium hydride solids could constitute an uneconomic use of the expensive reagent.

The molar ratio of the total charge of monomer to metal hydride compound initially formed, (monomer:metal hydride), is about (10.0:1.0) to about (1000.0:1.0), or about (40.0:1.0) to about (600.0:1.0), or about (150.0:1.0) to about (360.0:1.0). Whereas the molar quantity of metal hydride formed is taken as being equal to the molar quantity of organolithium carbon-metal bonds, the conjugate acid thereof having a $pK_a > H_2$— that remain after reaction with all protic species having a $pK_a < H_2$ under the conditions of the catalyst forming reactions. Any decrease in the amount of metal hydride due to decomposition reactions is not taken into account and conditions (e.g. temperatures) as well as reagents (e.g. organic species such as certain ethers that easily undergo metalation and decomposition by organolithium reagents) that contribute to catalyst deactivation are simply best avoided.

In the batch or semi-batch operation of the process technology of this invention the monomer (e.g. styrene) is fed with time to the reaction medium, hence the initial ratio monomer:organolithium at the very moment that the vapor from the first drop or increment of monomer fed is introduced to the reactor is mathematically approaching the limit (1:∞). Thus a total monomer charged to organolithium compound charged molar ratio outside the preferred recited ranges—i.e. a molar ratio in the range of from the limit of (1.0:∞ to about 1.00:0.101 which is about 9.9:1.0) monomer to organolithium—are demonstrated as workable ranges at the outset of each of the Examples provided below. However the monomer feed is generally continued until the higher desired monomer to metal hydride ratio is complete. The practice of a charge molar ratio limited to from the limit of (1.0:∞ to 1.00:0.10) is within the scope of the invention but simply represent uneconomical utilization of the organolithium compound.

Conversely feeding monomer at a relative molar ratio to organolithium greater than about 1000:1 becomes unworkable; resulting in diminished chain transfer producing compositions of undesired molecular weight distributions (MWD). The theoretical $M_n$ ($M_{n\ Th}$ a.k.a. $M_{calc}$) for a SASH polystyrene distribution formed from a ratio of 300:1 of styrene:organolithium compound is $M_{n\ Th}$ 300*104=31,200 Daltons. A typical hydrogen mediated SASH catalyst anionic chain transfer process employing 300:1 monomer to catalyst charge ratio can provide a pure polystyrene composition having $M_w$=1000. Thus the $Eff_{CT}$=31,200/600=52 and the amount of organolithium reagent needed to form a 600 $M_n$ composition is reduce 5200%. Charges well above about 600:1 are within the scope of the invention for the SASH processes but are less desired.

For the SASH process the molar ratio amount of the polytertiaryamine (PTA) promoter, when employing a monomeric PTA composition, relative to the total metal— i.e. the molar quantity of combined alkali and alkaline earth metal present in any form—charged, (PTA:metal) is about (1.2:1) to about (8:1), or about (1.3:1) to about (4:1) or about (1.8:1) to about (2.7:1). The amount of polytertiaryamine should be the amount needed to sufficiently dissolve the alkali metal alkoxide in the initially formed reaction medium and an amount needed to solubilize the SASH catalyst and promote the hydrogen chain transfer mechanism. Catalyst activity and apparently solubility of the SASH catalyst may both increase with increased molar ratios of (PTA:metal). But such increases in activity should level off and so charge ratios much above (4:1) offer little advantage if any and may lead to increased impurities formed from the excess free (not complexed to catalyst) polytertiaryamine.

The monomer feed rates relative to the amount of catalyst is among the determining kinetic factors with regard to setting the polymer composition's polydispersity, $PD_n$, and hence the overall molecular weight distribution (MWD) as measured by the values of $M_n$, $M_w$, $M_z$, $PD_n$, number average standard deviation ($\sigma_n$), and asymmetry ($_n\alpha_3$). It is therefore advisable to feed the monomer in certain relative rates at given $H_2$ activity (or partial pressure) in a given reactor design or geometry. It should be clear that a very small relative feed rate (i.e. less than about 15 moles monomer/hr/moles active Li) of the monomer to the catalyst will produce an undesired level of reduced (essentially hydrogenated) monomer and with some dimer. Furthermore the compositions produced have high asymmetry values and are less desired. On the other hand very high relative feed rates generally form higher molecular weight distributions, such compositions that can otherwise be economically produced with little to no chain transfer. Because neither the empirical nor molecular formula of the SASH catalyst is determined or necessarily defined, nor is the molecular weight of the these catalysts known, the hourly feed rate of monomer (styrene) relative to catalyst is expressed in terms of the amount of active hydride presumed to be present in the catalyst. It is assumed that each equivalent mole of active organolithium forms one equivalent mole of a saline hydride. Thus in the practice of this invention, the hourly feed rate of monomer to saline hydride compound should be in the range of from about 10 to about 350 moles of monomer per hour per mole of active saline hydride reagent charged in the reactor, or more preferably in the range of from about 65 to about 260 moles of monomer per hour per mole of saline hydride initially formed in the reactor. Again the equivalent mole of saline hydride is taken as being equal to the molar equivalent of the active organolithium initially charged when the catalyst is formed. Again active organolithium means the amount of organolithium groups left after reaction with any and all protic species having a $pK_a$ less than $H_2$ present in the reaction mixture. These remaining active organolithium groups are then taken as being completely converted to the active saline hydride by molecular hydrogen though the process can entail the intermediary formation of another saline metal group. For example n-butyllithium is likely converted to a transitory n-butylpotassium reagent before reduction to form a super active potassium hydride catalyst but the amount of potassium hydride is related to the amount of active n-butyllithium.

The temperature of the reaction mixture during the course of the monomer feed is maintained in the range of about 20° C. to about 130° C., or in the range of about 40° C. to about 99° C., or in the range of about 60° C. to about 90° C. It is conceivable that higher temperatures can be employed during the entire run or during a portion of the run; however temperatures that accelerate any decomposition of the catalyst and/or cause the elimination of hydride from the polymer chains and formation of chain lengths terminated with unsaturated bonds are best avoided. The amount of such hydride elimination termination reactions should vary with temperature and catalyst composition. In forming the SASH catalyst and during the initial heat up, the catalyst can be combined at the temperature just above the melting temperature of the hydrocarbon solvent (or mixture of solvents) or the freezing point of the monomer that is being fed. Combining the catalyst components at low temperatures (i.e. −10 to 15° C.) and even under cryogenic conditions (−10° C.

to −126° C.) may have the benefit of avoiding or suppressing lithiation or other metalation reactions that can lead to partial decomposition of the poly(tertiaryamine) promoter. However conditions that result in precipitation of the saline hydride catalyst or its precursor transitory complexes and reagents are perhaps best avoided.

The desired level of dispersal of monomer in the reaction medium will depend upon the efficiency by which hydrogen is transported from the vapor phase and/or hydrogen gas feed to the condensed phase throughout the course of a run. Ideally a commercial scale, pilot scale and even bench scale reactor can be designed and configured such that hydrogen transfer from the vapor phase to the condensed phase is essentially uniform throughout the course of the monomer feed. Under such uniform hydrogen transport between phases, it is desirable to minimize the reduction of monomer to its saturated analog by feeding the monomer such that a locally high concentration exists in the reactor. In bench or small pilot scale reactors such locally high monomer concentrations is accomplished by employing very high relative monomer to catalyst feed rates and ratios with the use of relatively low feed velocities. In large commercial equipment monomer is fed to a reaction zone which can be physically apart or separated from the bulk of the reaction mixture (i.e. a pump-around-loop).

Upon completion of the SASH catalyst process monomer feed and reaction, as indicated, for example, by rapid reduction in the process temperature at constant heat flux and/or the termination of uptake of $H_2$, the reaction mixture is maintained under hydrogen pressure and then transferred to a wash reactor for quenching and water washing. The wash reactor charged with water (with or without acid and a mineral acid such as $H_2SO_4$ or an organic acid such as acetic acid). Additionally the wash reactor can be previously charged with an optional additional amount of a hydrocarbon solvent. The quench can be conducted with cooling or at ambient temperatures up to the temperature at which the hydrocarbon solvent forms an azeotrope with water under the pressure conditions of the wash reactor. The product is water washed to remove alkali metal salts and at least a portion of the promoter and polarizing agent. Under very acidic conditions such reagents are nearly completely removed with the alkali and alkaline earth metal salts formed from the acid. Under basic conditions where an equivalent of acid or less is used the promoter is partitioned between the organic reaction mixture and the aqueous wash. Water washing is continued until the desired pH of the exiting wash water is obtained. Under basic conditions a pH of 9 to a pH of 11 indicates that all the alkali and alkali earth metal salts have been removed. Under acidic conditions a pH of 6 to a pH of 8 (depending on the alkalinity of the wash water) indicates that all acidic species have been removed or at least neutralized.

When the wash is deemed complete solvent and a portion of any remaining polytertiaryamine promoter and monomer reduction product are preferably separated and recovered from the reaction mixture, whereby the last traces of water are also removed azeotropically from the reaction mixture. This separation operation should be continued until monomer reduction product content of the resultant product mixture is less than about 0.1 wt %. Further modification and shaping of the product distribution by reducing the monomer dimer content is desirable for some applications. For high boiling dimers this is easily conducted using a wiped film evaporator.

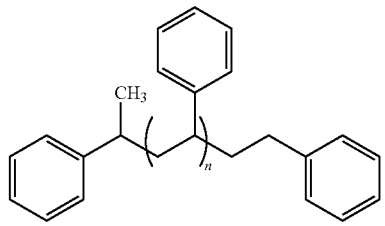

The most preferred initially formed hydrogen mediated saline hydride initiated styrenic distributions are formed exclusively from styrene monomer and hydrogen and have a chain length distribution of the above structure. Said chain length distribution is comprised of i−1 discrete polymer chain lengths in a statistical number average distribution of the relative molar content where i is a positive integer from i=2 to i=i. Thus for (Chain-1) when n=0 (styrene dimer) then i=2; (Chain-2) when n=1 (styrene trimer) then i=3; (Chain-3) n=2 (styrene tetramer) then i=4; (Chain-4) when n=3 (styrene pentamer) then i=5; (Chain-5) when n=4 (styrene hexamer) then i=6; . . . and (Chain−(i−1)) when n=i−2 then i=i. Thus the $(i-1)^{th}$ discrete polymer chain is the discrete polymer chain of the greatest chain length. We have found that in general the GPC molecular weight distribution (MWD) analysis results for the polymer compositions of this invention can be reasonably modeled with a gamma probability density function (PDF). More importantly however we have found that compositions formed from a SASH catalyst generally more accurately modeled with a Beta PDF; which would indicate that for the SASH catalyzed process the molecular weight distribution is set by chain transfer along with significant regeneration of dead polymer chains (styrene dimer) as well as indicates activation, participation or incorporation of ethylbenzene as an organic chain transfer agent in forming the polymer distribution.

The molecular weight distributions of the chain length distributions of this invention when styrene is the monomer are characterized where $M_n$ is in the range of from 315 to 905 Daltons; Mw is in the range of from about 392 to about 1716 Daltons; and $M_z$ is in the range of about 512 to 3031 Daltons; $PD_n$ is in the range of 1.24 to 1.90; with a standard deviation in the range of 156 to 857 Daltons and the asymmetry is in the range of 1.40 to about 3.14. More preferred compositions have molecular weight distributions where $M_n$ is in the range of from 410 to 680 Daltons; Mw is in the range of from about 553 to about 1205 Daltons; and $M_z$ is in the range of about 745 to 1950 Daltons; $PD_n$ is in the range of 1.29 to 1.82; with a standard deviation in the range of 257 to 600 Daltons and the asymmetry is in the range of 1.50 to about 2.60. Most preferred compositions have molecular weight distributions where $M_n$ is in the range of from 444 to 683 Daltons; Mw is in the range of from about 600 to about 1150 Daltons; and $M_z$ is in the range of about 798 to 1768 Daltons; $PD_n$ is in the range of 1.35 to 1.68; with a standard deviation in the range of 263 to 565 Daltons and the asymmetry is in the range of 1.50 to about 2.31.

Preferred non-blended compositions of this invention are comprised essentially only if not solely of styrene and have had their chain length distribution further shaped or modified by removal of a portion of the lowest molecular weight chains. Removal of the lower molecular weight chains, especially styrene dimer—like removing the lowest value(s) or a portion of the lowest value(s) from all other arithmetic averages (e.g. a grade point average)—results in a new average with an increased overall molecular weight distribution. Thus the preferred modified molecular weight distributions of this invention will overlap with the unaltered distributions but may not lie within the range of molecular weight distributions or molecular weight parameters specified above because of the simple numerical consequence of having been altered. Thus preferred compositions where the dimer has been reduced but is still present and represents 0.1 to 1.0 wt % (as determined by GPC analysis) of the entire distribution have molecular weight or chain length distributions where $M_n$ is in the range of from 407 to 968 Daltons; Mw is in the range of from about 487 to about 1746 Daltons; and $M_z$ is in the range of about 579 to 3038 Daltons; $PD_n$ is in the range of 1.40 to 1.80; with a standard deviation in the range of 180 to 868 Daltons and the asymmetry is in the range of 1.31 to about 3.12. More preferred compositions have molecular weight distributions where $M_n$ is in the range of from 494 to 788 Daltons; Mw is in the range of from about 623 to about 1278 Daltons; and $M_z$ is in the range of about 782 to 1964 Daltons; $PD_n$ is in the range of 1.26 to 1.62; with a standard deviation in the range of 253 to 621 Daltons and the asymmetry is in the range of 1.40 to about 2.40. Most preferred compositions have molecular weight distributions where $M_n$ is in the range of from 521 to 737 Daltons; Mw is in the range of from about 661 to about 1202 Daltons; and $M_z$ is in the range of about 827 to 1783 Daltons; $PD_n$ is in the range of 1.27 to 1.63; with a standard deviation in the range of 270 to 586 Daltons and the asymmetry is in the range of 1.40 to about 2.50.

It is pointed out that blending operations where statistical distributions are combined can result in non-statistical distributions where the provided constraints of for Par, standard deviations would not be applicable. However such blends are within the scope of this invention in that they are formed by combination of compositions of and formed from this invention.

Another embodiment of the present application is a hydrocarbon soluble catalyst or reagent composition formed from: (a) molecular hydrogen; (b) an organolithium compound; (c) a polytertiaryamine compound; (d) an alkoxide, wherein said alkoxide is an alkali metal alkoxide, and/or a magnesium alkoxide and/or calcium; (e) optionally an aromatic hydrocarbon having at least one C—H covalent bond $pK_a$ within the range of 2.75 $pK_a$ units above that of the $pK_a$ of toluene to −4.30 $pK_a$ units below the $pK_a$ of toluene; and in (f) a hydrocarbon solvent; wherein the aromatic hydrocarbon and hydrocarbon solvent may be the same or different; wherein the solubility of hydride comprising said catalyst is at least about 0.010 moles per liter and more preferably greater than about 0.10 moles per liter; and wherein when the metal alkoxide is a magnesium alkoxide the optional aromatic hydrocarbon is a vinyl aromatic monomer.

The same non-limiting examples and amounts of the components listed above for the SASH catalyst process may be used in the above catalytic composition and need not be repeated.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

The invention described and claimed herein is not to be limited in scope by the specific examples and embodiments herein disclosed, since these examples and embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

The following Examples illustrate the present invention. It is to be understood, however, that the invention, as fully described herein and as recited in the Claims, is not intended to be limited by the details of the following Examples HASH Catalyst Process Examples 1-3

Examples 1-3 provide non limiting examples of the HASH catalyst process. The apparatus used for the HASH catalyst process has been previously described in U.S. Pat. Nos. 5,771,169 and 5,866,720.

Example 1

HASH Catalyst Styrene Polymerization with Biphenyl Entraining Agent

Anhydrous tetrahydrofuran 820 g, 5 ml (4.33 g, 0.128 g-atoms alkali metal) of sodium potassium alloy (NaK$_2$) and 0.50 g (0.00324 mole) biphenyl were charged to the reactor at 20° C. under a dry nitrogen atmosphere. The unstirred reaction mixture was purged of nitrogen with hydrogen (3×65 PSIG) and the pressurized to 50 PSIG H$_2$. High speed high sheer mixing (1900 RPM) applied and styrene, 200.0 g (1.92 mole), was fed over 70 minutes (3.15 ml/min) to the reaction mixture. During the styrene monomer feed the reactor pressure was maintained between 50 and 40 PSIG H$_2$. Upon completion of the feed the reactor was vented of H$_2$ and the reaction mixture was carefully quenched with isopropyl alcohol. A sample of the quenched reaction mixture was analyzed by GPC and had the following MWD: $M_n$: 965, $M_w$: 2005, $M_z$: 3318, PD: 2.078, $\sigma_n$=1002, $_n\alpha_3$=2.602.

Example 2

HASH Catalyst Styrene Polymerization

Anhydrous tetrahydrofuran 820 g and 4.8 g (0.142 g-atoms alkali metal) of sodium potassium alloy (NaK$_2$) were charged to the reactor at 20° C. under a dry nitrogen atmosphere. The unstirred reaction mixture was purged of nitrogen with hydrogen (3×65 PSIG) and the pressurized to 55 PSIG $H_2$. High speed high sheer mixing (1900 RPM) applied and styrene, 217.0 g (1.92 mole), was fed over 76 minutes (3.15 ml/min) to the reaction mixture. During the styrene monomer feed the reactor pressure was maintained between 55 and 45 PSIG $H_2$. Upon completion of the feed the reactor was vented of $H_2$ and the reaction mixture was carefully quenched with isopropyl alcohol. A sample of the quenched reaction mixture was analyzed by GPC and had the following MWD: $M_n$: 897, $M_w$: 1677, $M_z$: 2722, PD: 1.87, $\sigma_n$=836, $_n\alpha3$=2.55.

Example 3

HASH Catalyst Styrene Polymerization w/o Entraining Agent

Anhydrous tetrahydrofuran 818 g and 6.2 g (0.183 g-atoms alkali metal) of sodium potassium alloy ($NaK_2$) were charged to the reactor at 20° C. under a dry nitrogen atmosphere. The unstirred reaction mixture was purged of nitrogen with hydrogen (3×70 PSIG) and the pressurized to 70 PSIG $H_2$. High speed high sheer mixing (1900 RPM) applied and styrene, 208.0 g (2.00 mole), was fed over 73 minutes (3.15 ml/min) to the reaction mixture. During the styrene monomer feed the reactor pressure was maintained between 70 and 60 PSIG $H_2$. Upon completion of the feed the reactor was vented of $H_2$ and the reaction mixture was carefully quenched with isopropyl alcohol. A sample of the quenched reaction mixture was analyzed by GPC and had the following MWD: 591, $M_w$: 943, $M_z$: 1438, PD: 1.60, $\sigma_n$=456, $_n\alpha3$=2.38. The reaction mass is transferred to a creased wash reactor containing ethylbenzene stripped of THF and then water washed. Further stripping on a wiped film evaporator WFE (2" glass Pope Still, graphite blades, operated at 300.0 mmHg vacuum, 140° C., 60% of full wiper speed feeding at 1.0 liter/hr rate) produced 191 g of a polystyrene resin having GPC MWD: $M_n$: 603, $M_w$: 956, $M_z$: 1373, PD: 1.58, $\sigma_n$=461, $_n\alpha_3$=1.906. A 164 g sample of the 191 g from above was subjected to a second WFE operation (at 0.4 mmHg vacuum, 230° C., 60% of full wiper speed feeding at 1.0 liter/hr rate) yielding 153.6 g of a resin having GPC MWD: $M_n$: 802, $M_w$: 1081, $M_z$: 1418, PD: 1.35, $\sigma_n$=473, $_n\alpha_3$=1.645.

SASH Catalyst Process Examples 4-60

Examples 4 through 60 provide processes for SASH catalyst process forming distributions of polystyrene polymer compositions of this invention.
General Apparatus Used
The apparatus used for HMSHIP processes is as follows. A 316 stainless steel 2-liter Parr autoclave having thermal couple, bottom drain valve, cooling coils, hot oil jacket and either two or three pitch-blade turbine impellers (with placement of each impeller as noted in the Examples) was further equipped with a piston pump, a diaphragm pump, nitrogen purged 250 ml stainless charge vessel, a well calibrated high pressure metering pump and a 1/16th inch OD subsurface monomer feed line having either a 0.02", or a 0.01" or a 0.007" ID terminal section (as noted in the Examples). The magnetic drive on the agitator is connected to a high speed air driven motor and generally operated such that the stirrer impellers spin at a rate of 1130±25 RPMs. The autoclave is vented to an oil bubbler and/or to a 6-liter oil jacketed creased wash vessel having a bottom drain and outfitted for overhead stirring and distillation. The bottom drain valve and the dip-leg sampling port are both plumbed to the wash vessel for direct transfer of the unquenched reaction mixture. Bulk solvent (e.g., cyclohexane or ethylbenzene or a mixture thereof recovered from a previous run) is charged to the reactor via piston pump through the charge vessel. The catalyst components (e.g., TMEDA/potassium t-butoxide/solvent solution and butyllithium) are charged separately to the reactor through the charging vessels. The contents of the charge vessel are pressure transferred with a minimum of nitrogen to the autoclave having either nitrogen or a hydrogen or a hydrogen/nitrogen atmosphere. Styrene is fed via high pressure metering pump through basic alumina columns to remove the inhibitor at predetermined constant rate. Hydrogen is fed to the head space and/or subsurface and maintained at the desired pressure. The autoclave reactor is heated with oil having a temperature set point at or just above (+1° C. to +3° C.) the desired reaction temperature and the reaction temperature was tightly maintained at the predetermined set point once the reactor controller lined out (generally after the first 20-30 minutes of the monomer feed when starting at ambient temperature). Thus the reaction temperature might have brief excursion in temperature generally no more than 5° C. above the desired set-point temperature.

During the course of the development of this invention 3 separate configurations (Configurations I-III below) or placements involving two, three or four pitch-blade turbine impellers was utilized:
 I. Two pitch blades with the first 6.25" and the second 10" from the top of the reactor.
 II. Two pitch blades with the first 5.5" and the second 10" from the top of the reactor.
 III. Three pitch blades with the first 4.0", the second 6.75" and the third 10" from the top of the reactor.

Thus Configuration I generally resulted in a significant reduction in hydrogen up take during the last one third of the monomer styrene feed. Configurations II and III generally resulted in an intermediate slowing of the uptake of hydrogen during the course of the feed with the hydrogen uptake restored during the latter half of the feed. In that the polymerization reactor is 2000 ml in volume having a maximum working volume of 1750 ml and the initially formed reaction mixture is typically 400 to 600 ml in volume, then the maximum volume of styrene that can be safely fed is in the range of 1350 ml to 1150 ml (not accounting for temperature or changes in density upon polymerization). Thus feeding such volumes of styrene (1150 ml to 1350 ml) is deemed as a full charge of styrene or of monomer for this reactor configuration. The terms full charge of styrene or partial charge of styrene or any term or other phrase used to imply a fractional portions of styrene charged are limitations or restrictions for the apparatus as described above and in no way represents a limitation on the processes or practice of this invention in a reactor system(s) having a different reactor geometry or configuration or mode of operation (batch, semi-batch, semi-continuous, continuous, back-mixed or plugged flow are all modes and/or configurations within the scope of this invention). The Examples recited below are representative of batch or semi-batch operations of this invention. Clearly one of ordinary skill in the art can take the teachings of these Examples and extend the application of this invention to include modes of operation that entail continuous operation with and/or without some level of back mixing and accordingly such modes are well within the scope of this invention.

When charges are made to the polymerization reactor under a nitrogen atmosphere, the autoclave reactor is purged at least 3 times by pressurizing and then venting with 65 PSIG $H_2$ (65 PSIG to 0 PSIG). The polymerization reactor is then pressurized to the desired $H_2$ pressure. If reactor charges are made to the reactor containing a hydrogen atmosphere, then the reactor is pressure and vented 2 times with 50 PSIG $H_2$. Styrene (99%, Acros), TMEDA (Aldrich), Potassium t-Butoxide (97% Alfa Aesar), n-Butyllithium (2M in Cyclohexane, Aldrich), are each used as received from the vendor. Anhydrous cyclohexane, and ethylbenzene (both Aldrich) are handled under an inert dry nitrogen atmosphere. The reaction mixture is quenched by transfer to the wash reactor.

Examples 4-9

The experimental details of Examples 4-9 (reaction conditions, reagent charges, and initial as well as final catalyst concentration), scale-up parameters (relative feeds and relative monomer hourly feed rates) and results (polymer molecular weight distribution as determined by GPC and polymer yield) are presented in tabular form in Table III. Catalyst concentration is expressed as ppm KH*, this calculation assumes that all KH formed is in the super active form and is soluble in the reaction medium as a single saline hydride species (not an aggregate) ignoring any complex formed with TMEDA (in the mass calculation) and any amount of catalyst that exist on a living polymer chain or polymer initiating species. It is expressed this way for descriptive purposes only to simplify the comparison of one embodiment of this invention with yet another. For illustrative purposes Example 4 and Example 6 are described in greater detail below.

Example 4

Demonstrates Preliminary Catalyst Screening Reaction Employing Reduced Styrene Feed Volume Anhydrous cyclohexane 500 g, was charged to the reactor at 23° C. under a dry nitrogen atmosphere. To the stirred solvent (800 RPM, twin pitch blade impellers, blade placement Configuration I) was charged through the charge vessel a solution previously formed from 11.2 g (0.998 mol.) potassium t-butoxide, 1.06 g (0.01 mol.) ethylbenzene, and 47 g (0.404 mol.) TMEDA. The vessel and line to the reactor was flushed with a 75 g portion of cyclohexane. Next 50 ml (0.100 mol.) 2.0 M n-butyllithium was transferred through the charge vessel to the reactor followed by a 50 g aliquot of cyclohexane. The reactor agitation was increased to 1130 RPM and then purged of $N_2$ by pressuring to 65 PSIG with dry $H_2$ (through the headspace) and venting three times (slowly venting to keep the contents from foaming out of the reactor). The $H_2$ regulator to 25 PSIG and 200 g (1.92 mol.) styrene was fed through a subsurface feed line (0.01" ID tip, 5.2 ft/s) against the hydrogen head pressure over a period of 46 minutes while maintaining the reactor temperature at 27° C. At the end of the styrene feed, the monomer feed line to the reactor, including the alumina column, were flushed with 50 ml of anhydrous cyclohexane. The styrene feed and flush to the reactor was deemed complete when no further heat of reaction was observed generally signified by the permanent closing of the automated control valve on the coiling coils. During the course of the run the valve to the hydrogen regulator was periodically closed to verify uptake of hydrogen during the styrene feed.

Standard Workup Procedure

The unquenched content of the reaction mixture was transferred to the wash vessel ($N_2$ atmosphere) previously charged with 300 ml of deoxygenated water heated to 65° C. Thus the reaction mixture is quenched with care in the wash reactor. The reaction mixture was then washed with deoxygenated water (3×300 ml total). Phase cuts were made at 60° C., and were rapid requiring little settling time. Water and any rag or emulsion was removed through the bottom drain valve. The pH of the wash water removed from the reactor was monitored, the first wash invariably had pH=14. Additional deoxygenated water washes (≈300 ml) were conducted until the removed water wash phase had a pH=10 indicating that all alkali metal had been removed. As a note to other experiments, in general a total of 3 washes and never more than 5 washes were needed to reach a pH=10 (standard pH paper). An aliquot of the wash reaction mixture was removed for analysis via GPC ($M_n$: 357, $M_w$: 545, $M_z$: 936, PD: 1.53, $\sigma_n$=259, $_n\alpha_3$=3.72).

Example 6

Representative of Full Scale Monomer Feed Volume for SASH Catalyst Runs in Cyclohexane at Moderate Temperatures 56°-65° C. Runs Anhydrous cyclohexane 250 g, was charged to the reactor at 23° C. under a dry nitrogen atmosphere. To the stirred solvent (1130 RPM, twin pitch blade impellers, blade placement Configuration I) was charged through the charge vessel a solution previously formed from 3.27 g (0.0291 mol.) potassium t-butoxide, 3.56 g (0.0336 mol.) ethylbenzene, and 15.00 g (0.129 mol.) TMEDA. The charge vessel and transfer line to the reactor was flushed with a 70 g portion of cyclohexane. Next 14.56 ml (0.0291 mole) 2.0 M n-butyllithium was transferred through the charge vessel to the reactor followed by a 70 g aliquot of cyclohexane. Agitation was increased to 1130 RPM and the reactor purged of $N_2$ by pressuring to 65 PSIG with dry $H_2$ (through the headspace) and venting three times (slowly venting to keep the contents from foaming out of the reactor). The $H_2$ regulator was set to 19 PSIG, the reactor was heated to 60° C. and 911 g (8.75 mol.) styrene was fed through a subsurface feed line (0.01" ID tip, 5.2 ft/s) against the hydrogen head pressure over a period of 208 minutes maintaining the reactor at 66° C. At the end of the styrene feed, the monomer feed line to the reactor, including the alumina columns, were flushed with 50 ml of anhydrous cyclohexane. The styrene feed and flush to the reactor was deemed complete when no further heat of reaction was observed generally signified by the permanent closing of the automated control valve on the coiling coils. During the course of the run the valve to the hydrogen regulator was periodically closed to verify uptake of hydrogen during the styrene feed. After ca. 90% of the styrene feed had been completed, hydrogen up take had slowed considerably.

The unquenched content of the reaction mixture was washed following the Standard Workup Procedure. An aliquot of the washed reaction mixture was removed for analysis via GPC ($M_n$: 455, $M_w$: 697, $M_z$: 1044, PD: 1.53, $\sigma_n$=332, $_n\alpha_3$=2.37).

Standard Product Isolation Procedure

The product was stripped in the wash reactor of cyclohexane, TMEDA and ethylbenzene by normal distillation while gradually heating the wash reactor's jacket temperature to 165° C. The distillation was deemed complete when the pot temperature reached a temperature above 135° C.

The solution was allowed to cool before collecting 939 g of solution. The solution was then further stripped of ethylbenzene and TMEDA with the use of a wiped film evaporator (WFE, 2" glass Pope Still, operated at 50.0 mmHg vacuum, 140° C., 60% of full wiper speed, feeding at 1.0 liters/hr). This first WFE operation produced 677 g of a super active saline hydride initiated polystyrene distribution (SASH PS distribution) having GPC MWD of $M_n$: 357, Mw: 545, $M_z$: 936, PD: 1.53, $\sigma_n$=259, $_n\alpha_3$=3.72. A second WFE operation. (0.1-0.3 mmHg vacuum, 120° C., 60% of full wiper speed, feeding at 1.0 liters/hr) provided 638.1 g of a SASH PS distribution having 12.26 GPC area % styrene dimer content and a GPC MWD of $M_n$: 483, $M_w$: 724, $M_z$: 1066, PD: 1.50, $\sigma_n$=341, $_n\alpha_3$=2.30.

Examples 10-19

The experimental details of Examples 10-19 (reaction conditions, reagent charges, and initial as well as final catalyst concentration), scale-up parameters (relative feeds and relative hourly feed rates) and results (polymer molecular weight distribution as determined by GPC and polymer yield) are presented in tabular form in Table IV. Product yields in excess of 100% represent a net incorporation of the organic chain transfer agent, which in these examples is ethylbenzene. Product yields of less than 100% represent a net production of ethylbenzene. SASH Catalyst Example 14 resulted in a 100% yield on the SASH PS polymer distribution for the entire distribution which includes all discrete polymer chains (i.e. all chains dimers and above). Example 14 provided an 88% SASH PS polymer distribution yield after removal of dimer and is considered representative of the practice of the 10 Examples of Table IV. Thus Example 14 is described in greater detail below.

Example 13

Representative of 80% Monomer Feed Volume for SASH Catalyst Runs in Ethylbenzene at Moderate Temperatures 70° C.

Anhydrous ethylbenzene 200 g of 300 g (2.83 mole), was charged to the reactor at 20° C. under a dry nitrogen atmosphere. To the stirred solvent (800 RPM, twin pitch blade impellers, blade placement Configuration I) was charged through the charge vessel a solution previously formed from 4.57 g (0.0407 mol.) potassium t-butoxide, 44 g (0.41 mol.) ethylbenzene, and 20.83 g (0.179 mol.) TMEDA. The charge vessel and transfer line to the reactor was flushed with a 50 g portion of ethylbenzene of the 300 g above. Next 20.34 ml (0.0407 mole) 2.0 M n-butyllithium was transferred through the charge vessel to the reactor followed by a 50 g aliquot of ethylbenzene from above. The reactor was heated to 65° C. Agitation was then increased to 1130 RPM and the reactor purged of $N_2$ by pressuring to 65 PSIG with dry $H_2$ (through the headspace) and venting three times (slowly venting to keep the contents from foaming out of the reactor). The $H_2$ regulator was set to 11 PSIG and 800 g (7.68 mol.) styrene was fed through a subsurface feed line (0.01" ID tip, 5.2 ft/s) against the hydrogen head pressure over a period of 183 minutes controlling the temperature at 70° C. At the end of the styrene feed, the monomer feed line to the reactor, including the alumina columns, were flushed with 50 ml of anhydrous cyclohexane. The styrene feed and flush to the reactor was deemed complete when no further heat of reaction was observed generally signified by the permanent closing of the automated control valve on the coiling coils.

The unquenched content of the reaction mixture was transferred to the wash reactor and then washed following the Standard Workup Procedure. During the transfer of the unquenched reaction mixture a 10 ml sample of the reaction mixture is obtained for analysis. The sample is red in color and transparent to light giving it an appearance similar to the color of a living APS process sample. The sample's appearance is completely unlike the characteristic dark black-red (black cherry) color of samples anionic chain transfer polymerization conducted in the absence of a hydrogen atmosphere. Such samples of SASH catalyst where the catalyst components are combined under $N_2$ before forming the hydride generally can contain large (mm size) catalyst particles. The sample is quenched by the addition of a drop of methanol which immediately quenches the red color and results in the immediate formation and evolution of hydrogen gas. GPC Analysis of the crude quenched reaction mixture was as follows: $M_n$: 367, $M_w$: 497, $M_z$: 695, PD: 1.35, $\sigma_n$=218, $_n\alpha_3$=2.38.

The product was then isolated following the Standard Product Isolation Procedure to yield 827.9 g of a SASH PS distribution having GPC MWD of $M_n$: 376, $M_w$: 508, $M_z$: 707, PD: 1.35, $\sigma_n$=223, $_n\alpha_3$=3.34. THE second WFE operation (0.1-0.3 mmHg vacuum, 172.5° C., 60% of full wiper speed, feeding at 1.0 liters/hr) provided 608.7 of a SASH PS distribution having 0.99 GPC area % styrene dimer content and a GPC MWD of $M_n$: 486, $M_w$: 593, $M_z$: 750, PD: 1.22, $\sigma_n$=228, $_n\alpha_3$=2.15.

Example 14

Representative of Full Scale Monomer Feed Volume for SASH Catalyst Runs in Ethylbenzene at Moderate Temperatures 65° to 75° C.

Anhydrous ethylbenzene 200 g of 300 g (2.83 mole), was charged to the reactor at 20° C. under a dry nitrogen atmosphere. To the stirred solvent (800 RPM, twin pitch blade impellers, blade placement Configuration I) was charged through the charge vessel a solution previously formed from 3.02 g (0.0269 mol.) potassium t-butoxide, 43.5 g (0.41 mol.) ethylbenzene, and 13.75 g (0.118 mol.) TMEDA. The charge vessel and transfer line to the reactor was flushed with a 50 g portion of ethylbenzene. Next 13.44 ml (0.0269 mole) 2.0 M n-butyllithium was transferred through the charge vessel to the reactor followed by a 50 g aliquot of ethylbenzene. The reactor was heated to 65° C. Agitation was then increased to 1130 RPM and the reactor purged of $N_2$ by pressuring to 65 PSIG with dry $H_2$ (through the headspace) and venting three times (slowly venting to keep the contents from foaming out of the reactor). The $H_2$ regulator was set to 15 PSIG and 1050 g (10.08 mol.) styrene was fed through a subsurface feed line (0.01" ID tip, 5.2 ft/s) against the hydrogen head pressure over a period of 240 minutes controlling the temperature at 67° C.-68° C. At the end of the styrene feed, the monomer feed line to the reactor, including the alumina columns, were flushed with 50 ml of anhydrous cyclohexane. The styrene feed and flush to the reactor was deemed complete when no further heat of reaction was observed generally signified by the permanent closing of the automated control valve on the coiling coils. During the course of the run the valve to the hydrogen regulator was periodically closed to verify uptake of hydrogen during the styrene feed. After 80-90% of the styrene feed had been completed, hydrogen up take had slowed considerably.

The unquenched content of the reaction mixture was transferred to the wash reactor and then washed following the Standard Workup Procedure. During the transfer of the unquenched reaction mixture a 10 ml sample of the reaction mixture is obtained for analysis. The sample is red in color and transparent to light giving it an appearance similar to the color of a living APS process sample. The sample's appearance is completely unlike the characteristic dark black-red (black cherry) color of samples anionic chain transfer polymerization conducted in the absence of a hydrogen atmosphere. Such samples of SASH catalyst where the catalyst components are combined under $N_2$ before forming the hydride generally can contain large (mm size) catalyst particles. The sample is quenched by the addition of a drop of methanol which immediately quenches the red color and results in the immediate formation and evolution of hydrogen gas. GPC Analysis of the crude quenched reaction mixture was as follows: $M_n$: 560, $M_w$: 914, $M_z$: 1344, PD: 1.63, $\sigma_n$=445, $_n\alpha_3$=2.03.

The product was then isolated following the Standard Product Isolation Procedure to yield 1050 g of a SASH PS distribution having GPC MWD of $M_n$: 357, $M_w$: 545, $M_z$: 936, PD: 1.53, $\sigma_n$=259, $_n\alpha_3$=3.72. A second WFE operation. (0.1-0.3 mmHg vacuum, 172.5° C., 60% of full wiper speed, feeding at 1.0 liters/hr) provided 925.0 of a SASH PS distribution having 0.99 GPC area % styrene dimer content and a GPC MWD of $M_n$: 728, $M_w$: 1019, $M_z$: 1380, PD: 1.40, $\sigma_n$=460, $_n\alpha_3$=1.80.

Upon completion of the run the autoclave reactor was rinsed with standard drum grade (not anhydrous) ethylbenzene, purged well with nitrogen and then opened for inspection. Although the heated reactor walls were generally free of solids, however, the cold surfaces (i.e. cooling coils, agitator assembly, dip leg, monomer feed-line and thermowell) were heavily coated with red crystalline solids up to solvent line demarking the initial reactor stirred content volume—i.e. the height or level of stirred reaction medium formed prior to charging hydrogen and styrene.

Examples 20-28

The experimental details of Examples 20-28 (reaction conditions, reagent charges, and initial as well as final catalyst concentration), scale-up parameters (relative feeds and relative hourly feed rates) and results (polymer molecular weight distribution as determined by GPC and polymer yield) are presented in tabular form in Table V. Because these Examples feature recycle oligomer (comprised mainly of dimer>90%) recovered from a previous run or runs, GPC MWD are reported only for the crude product distribution excludes the styrene dimer content. Product yields in excess of 100% represent a net incorporation of the organic chain transfer agent, which in these examples is ethylbenzene. In general the amount of dimer recovered was ≈100% less to ≈80% more than that which was charged in the recycle. Product yields of less than 100% represent a net production of ethylbenzene and/or dimer. SASH Catalyst Example 24 resulted in a 102% yield of the SASH PS polymer distribution and a 100% yield on the dimer stripped SASH PS product distribution. Example 24 which utilized 93.5 g of recovered dimer stream having GPC $M_n$=234, provided 120 g of recovered dimer with $M_n$=215. Thus Example 14 and the other 8 Examples presented in Table V very well demonstrate high yield hydrogen mediated saline hydride initiated styrene polymerization process. Example 24 is representative of the practice of the 9 Examples of Table IV. Thus Example 24 is described in greater detail below.

Example 24

Representative of Full Scale Monomer Feed Volume for SASH Catalyst w/Recycle Oligomer at Moderate Temperatures 70° to 75° C.

An anhydrous solvent mixture comprised of ethylbenzene 154.76 g (1.46 mol), 126.84 g cyclohexane, and 93.46 g styrene oligomer mix ($M_n$=234, 0.043 mole) was charged to the reactor at 23° C. under a dry nitrogen atmosphere. To the stirred solvent (800 RPM, twin pitch blade impellers, blade placement Configuration I) was charged through the charge vessel a solution previously formed from 3.51 g (0.0313 mol.) potassium t-butoxide, 51.5 g (0.49 mol.) ethylbenzene, and 15.98 g (0.138 mol.) TMEDA. The charge vessel and transfer line to the reactor was flushed with a 30 ml portion of anhydrous cyclohexane. Next 15.63 ml (0.0313 mole) 2.0 M n-butyllithium was transferred through the charge vessel to the reactor followed by a 25 g aliquot of cyclohexane. Agitation was then increased to 1130 RPM and the reactor purged of $N_2$ by pressuring to 65 PSIG with dry $H_2$ (through the headspace) and venting three times (slowly venting to keep the contents from foaming out of the reactor). The $H_2$ regulator was set to 20 PSIG and the reactor heated to 72° C. while feeding 1172 g (11.26 mol.) styrene. The styrene was fed through a subsurface feed line (0.01" ID tip, 5.3 ft/s) against the hydrogen head pressure over a period of 263 minutes controlling the reaction temperature at 72° C. At the end of the styrene feed, the monomer feed line to the reactor, including the alumina columns, were flushed with 50 ml of anhydrous cyclohexane. The styrene feed and flush to the reactor was deemed complete when no further heat of reaction was observed generally signified by the permanent closing of the automated control valve on the coiling coils. During the course of the run the valve to the hydrogen regulator was periodically closed to verify uptake of hydrogen during the styrene feed. After ca.75% of the styrene feed had been completed, hydrogen up take had slowed considerably.

The unquenched content of the reaction mixture was transferred to the wash reactor and then washed following the Standard Workup Procedure. During the transfer of the unquenched reaction mixture a 10 ml sample of the reaction mixture was obtained for analysis. The sample was red to dark red in color and transparent to light with little to no settled or suspended solids. The sample was quenched by the addition of a drop of methanol which immediately quenches the red color and results in the immediate formation and evolution of hydrogen gas. GPC Analysis of the crude quenched reaction mixture excluding the dimer content was as follows: $M_n$: 744, $M_w$: 1045, $M_z$: 1390, PD: 1.40, $\sigma_n$= 473, $_n\alpha_3$=1.59.

The product was then isolated following the Standard Product Isolation Procedure to yield 1289 g SASH PS distribution (SASH PS distribution) having GPC MWD excluding dimer of $M_n$: 770, $M_w$: 1096, $M_z$: 1490, PD: 1.42, $\sigma_n$=501, $_n\alpha_3$=1.76. A second WFE operation (0.1-0.3 mmHg vacuum, 172.5° C., 60% of full wiper speed, feeding at 1.0 liters/hr) provided 1169 g of a SASH PS distribution having 0.60 GPC area % styrene dimer content and a GPC MWD of $M_n$: 750, $M_w$: 1053, $M_z$: 1395, PD: 1.40, $\sigma_n$= 477, $_n\alpha_3$=1.56.

Upon completion of the run the autoclave reactor was rinsed with standard drum grade (not anhydrous) ethylbenzene, purged well with nitrogen and then opened for inspection. The heated reactor walls and the cold surfaces (i.e. cooling coils, agitator assembly, dip leg, monomer feed-line and thermowell) generally free of crystalline solids. A small amount of red crystalline solids did adhere to the monomer feed line drip tip. It is deemed that based on this experiment and the others like it that the presence of monomer in significant quantities suppresses crystallization of the TMEDA complexed organopotassium anions formed under the nitrogen atmosphere prior to reduction with hydrogen to form the SASH catalyst.

Examples 29-36

The experimental details of Examples 29-36 (reaction conditions, reagent charges, and initial as well as final catalyst concentration), scale-up parameters (relative feeds and relative hourly feed rates) and results (polymer molecular weight distribution as determined by GPC and polymer yield) are presented in tabular form in Table VI.

Example 29

Partial Monomer Feed to Form SASH Catalyst from a Living Anionic Polystyrene Distribution Anhydrous cyclohexane 300 ml, was charged to the reactor at 19° C. under a dry nitrogen atmosphere. To the stirred solvent (800 RPM, twin pitch blade impellers, blade placement Configuration I) was sequentially charged through the charge vessel 0.64 g (0.0325 mole) TMEDA in 50 ml cyclohexane followed by 16.27 ml (0.0325 mole) 2.0 M n-butyllithium and followed by 50 ml cyclohexane to flush the charge vessel and lines to the reactor. Styrene, 25 g of the total charge of 316.4 g (3.04 mol), was fed over 2.8 minutes (10 ml/min) to the TMEDA:butyllithium initator to form the living APS composition. The styrene metering pump was then set to 0.25 ml/min and the feed was continued at the reduced rate while a solution previously formed from 3.63 g (0.0324 mol.) potassium t-butoxide, 109 ml cyclohexane, and 18.96 g (0.137 mol.) TMEDA was charged to the reactor. The charge vessel and transfer line to the reactor was flushed with a 50 ml portion of cyclohexane. Agitation was then increased to 1130 RPM and the reactor purged of $N_2$ by pressuring to 65 PSIG with dry $H_2$ (through the headspace) and venting three times (slowly venting to keep the contents from foaming out of the reactor). The $H_2$ regulator was set to 72 PSIG and the reactor heated to 72° C. while feeding the remainder of the styrene at a feed rate of 4.93 ml/min. The bulk of the styrene was fed through a subsurface feed line (0.01" ID tip, 5.3 ft/s) against the hydrogen head pressure over total feed time of ≈71 minutes controlling the reaction temperature at 72° C. At the end of the styrene feed, the monomer feed line to the reactor, including the alumina columns, were flushed with 50 ml of anhydrous cyclohexane. The styrene feed and flush to the reactor was deemed complete when no further heat of reaction was observed generally signified by the permanent closing of the automated control valve on the coiling coils.

The unquenched polymerization reaction mixture was transferred with positive $H_2$ pressure to the wash vessel previously heated ($N_2$ atmosphere) and previously charged with 300 ml of deoxygenated water along with 100 ml of recovered cyclohexane distilled from previous runs. Thus the reaction mixture is quenched with care in the wash reactor. The transfer however for this Example and the next five Examples (Examples 30-34) of Table VI was through the dip leg sample port thus leaving 100 ml or approximately 82 g of reaction mixture in the reactor. The reaction heel thus formed was then used in the subsequent run to form the catalyst. Only for Example 35 was the entire content of the reactor transferred to the wash reactor and thereby completing this set of Examples. The quenched reaction mixture from Example 29 was discarded and not used to form the composite of the other 6 runs.

During the transfer of the unquenched reaction mixture a 10 ml sample of the reaction mixture was obtained for analysis. The sample was light pink (pink lemonade to under ripe water melon) in color and transparent to light with a small content suspended solids. The sample was quenched by the addition of a drop of methanol which immediately quenches the pink color and results in the instantaneous formation and evolution of hydrogen gas. The suspended solids appear to continue to produce or liberate hydrogen for a short period of time. GPC Analysis of the crude quenched reaction mixture was as follows: $M_n$: 351, $M_w$: 706, $M_z$: 1331, PD: 1.40, $\sigma_n$=353, $_n\alpha_3$=3.53. It should be noted that this GPC MWD was bimodal having a high molecular weight fraction with $M_n$: 1330, $M_w$: 1480, $M_z$: 1680, PD: 1.12, $\sigma_n$=447, $_n\alpha_3$=1.776 that made up about 35 GPC area % of the dimer and above composition, most of the composition was ethylbenzene.

Examples 30 and 31

Representative of Full Scale Monomer Feed Volume for SASH Catalyst Runs in Cyclohexane with SASH Catalyst Formed w/o Added Organic Chain Transfer Agent 72° C. Runs To the heel from the previous Example was charged 250 ml of anhydrous cyclohexane at 30° C. to the reactor under a hydrogen atmosphere (0 PSIG). To the stirred reaction mixture (1130 RPM, twin pitch blade impellers, the first at the bottom of the stirrer shaft and the second placed 5.0 inches above the first) was charged through the charge vessel a solution previously formed from 3.63 g (0.0324 mol.) potassium t-butoxide, 109 ml cyclohexane and 19.6 g (0.169 mol.) TMEDA. The charge vessel and transfer line to the reactor was flushed with a 50 ml portion of cyclohexane. Next 16.11 ml (0.0322 mole) 2.0 M n-butyllithium was transferred through the charge vessel to the reactor followed by a 50 ml aliquot of cyclohexane. Trace $N_2$, introduced the charging the catalyst components, was purged by pressuring to 50 PSIG with dry $H_2$ (through the headspace) and venting three times (slowly venting to keep the contents from foaming out of the reactor). The $H_2$ regulator was set to 72 PSIG, the reactor was heated to 72° C. while 912.4 g (8.76 mol.) styrene was fed through a subsurface feed line (0.01" ID tip, 5.3 ft/s) against the hydrogen head pressure over a period of 205 minutes maintaining the reactor at 72° C. At the end of the styrene feed, the monomer feed line to the reactor, including the alumina columns, were flushed with 50 ml of anhydrous cyclohexane. The styrene feed and flush to the reactor was deemed complete when no further heat of reaction was observed generally signified by the permanent closing of the automated control valve on the coiling coils. During the course of the run the valve to the hydrogen regulator was periodically closed to verify uptake of hydrogen during the styrene feed. After about 66% of the styrene feed had been completed, hydrogen up take had slowed considerably vs. the initial amount but uptake did continue at a sufficient rate until the end of the styrene monomer feed.

The unquenched polymerization reaction mixture was transferred with positive $H_2$ pressure to the wash vessel previously heated 65° C. ($N_2$ atmosphere) and previously charged with 300 ml of deoxygenated water and left to stir. The transfer of the crude reaction mixture was through the dip leg sample port thus leaving 100 ml, or approximately 82 g, of reaction mixture in the reactor for the next run. The reactor was then charged with 250 ml of anhydrous cyclohexane and cooled to 30° C. while stirring at 400 rpm under a 65 psig hydrogen atmosphere.

For Example 31 the SASH styrene polymerization process was repeated exactly to within minor experimental differences as above for Example 30. Upon completion of the run, the content of the reactor was transferred through the dip leg sample port to the heated (65° C.) and stirred quenched reaction mixture from Example 30 with the 300 ml aqueous solution previously formed. A 100 ml heel of Example 31 that was left behind was combined with 250 ml of anhydrous cyclohexane and cooled to 30° C. for the next Example in this series of runs.

The combined quenched reaction mixtures formed from Examples 30 and 31 were water washed (3×300 ml) with deoxygenated water, concentrated by distilling cyclohexane, TMEDA and the Ethylbenzene formed in the process until a pot temperature of 135° C. was reached. Upon cooling these samples were collected and set aside to later combine with washed and stripped product mixtures formed from Examples 32 and 33 and Examples 34 and 35.

During the transfers of the unquenched reaction mixtures of Examples 30 and 31, 10 ml samples of each reaction mixture were obtained for analysis. The samples were light pink in color and transparent to light with a small content suspended solids. The samples when quenched by the addition of a drop of methanol immediately evolved hydrogen gas and became colorless. GPC analyses of Examples 30 and 31 crude quenched reaction mixture was as follows: Ex. 30. $M_n$: 401, $M_w$: 637, $M_z$: 1067, PD: 1.59, $\sigma_n$=308, $_n\alpha_3$=3.24; Ex. 31: $M_n$: 423, $M_w$: 659, $M_z$: 1025, PD: 1.59, $\sigma_n$= 316, $_n\alpha_3$=2.64. Thus the compositions were nearly identical in molecular weight with Example 30 having a slightly increased asymmetry from the $M_w$=1480 Dalton APS artifact from Example 29.

Example 36

Blending, Ethylbenzene and Dimer Recovery by Wiped Film Evaporation of Said Composite A composite blend was formed from the combined washed and stripped product mixtures of Examples 30 and 31, Examples 32 and 33 and Examples 34 and 35. This was accomplished by adding said washed and stripped blends of Examples 30 and 31, Examples 32 and 33 back the wash reactor containing the washed and stripped blend of Examples 34 and 35 at 100° C. After blending the product solution was allowed to cool before collecting 4857.99 of solution. The product solution was then further stripped of ethylbenzene and TMEDA with the use of a wiped film evaporator (WFE, 2" glass Pope Still, operated at 50.0 mmHg vacuum, 140° C., 60% of full wiper speed, feeding at 1.0 liters/hr). This first WFE operation produced 2986.7 g (61.5% Yield styrene dimer and above) SASH PS distribution having GPC MWD of $M_n$: 428, $M_w$: 663, $M_z$: 1050, PD: 1.55, $\sigma_n$=317, $_n\alpha_3$=2.83. A second WFE operation. (0.1-0.3 mmHg vacuum, 172.5° C., 60% of full wiper speed, feeding at 1.0 liters/hr) provided 2332.7 (50% yield) of a SASH PS distribution having 1.4 GPC area % styrene dimer content and a GPC MWD of $M_n$: 558, $M_w$: 763, $M_z$: 1100 PD: 1.40, $\sigma_n$=477, $_n\alpha_3$=1.56. Also recovered from the second WFE operation was 642.18 g of a styrene oligomer composition having $M_n$: 213, $M_w$: 220, $M_z$: 227 PD: 1.031.

Upon completion of the series of 7 runs (Examples 29-35) the autoclave reactor was rinsed with standard drum grade (not anhydrous) cyclohexane, purged well with nitrogen and then opened for inspection. The heated reactor walls and the cold surfaces (i.e. cooling coils, agitator assembly, dip leg, monomer feed-line and thermowell) generally free of crystalline solids. However, a small deposit of water soluble white powdery solids adhered to the heated walls of the polymerization reactor.

Examples 37-43

The experimental details of Examples 37-43 (reaction conditions, reagent charges, and initial as well as final catalyst concentration), scale-up parameters (relative feeds and relative hourly feed rates) and results (polymer molecular weight distribution as determined by GPC and polymer yield) are presented in tabular form in Table VII. Examples 37-42 were conducted in a manner analogous to Example 14 presented in detail above. It is clear from the results of these Examples that these represent less preferred embodiments of the present invention. It should be understood that Example 37 employs an organic chain transfer agent, m-xylene, and as a consequence produces a polystyrene composition in which a significant portion of the composition is initiated with m-xylene as well as the portion initiated with the SASH catalyst. Example 38 indicates at least for this polymerization temperatures as low as 35° C. are less preferred. Examples 39-42 demonstrate that both sodium and lithium are less preferred forms of SASH catalyst for forming low molecular weight anionic chain transfer polystyrene distributions. Example 43 is described in greater detail below.

Example 43

Monometallic Lithium SASH Catalyst Process

Anhydrous ethylbenzene 300 g, was charged to the reactor at 20° C. under a hydrogen atmosphere (0 PSIG). To the stirred solvent (800 RPM, twin pitch blade impellers, blade placement Configuration III) was charged through the charge vessel a solution previously formed from 3.62 g (0.0489 mol.) of tert-butyl alcohol, 69.9 g (0.66 mol.) of ethylbenzene, and 23.50 g (0.202 mol.) of TMEDA. The charge vessel and transfer line to the reactor was flushed with a 50 g portion of ethylbenzene. Agitation was increased to 1130 RPM and then 54.10 ml (0.11 mole) of 2.0 M n-butyllithium dissolved in 100 g of ethylbenzene was transferred slowly through the charge vessel to the reactor. The reactor temperature rose 5° C. to 25° C. and the pressure increased to 2 PSIG then dropped to −4 PSIG drawing the butyllithium solution and a subsequent 50 g rinse aliquot of ethylbenzene into the reactor. The reactor containing a total of 570 g (5.4 mol.) of ethylbenzene was heated to 90° C. Trace $N_2$ introduced during the catalyst component charge was purged by pressuring to 50 PSIG with dry $H_2$ (through the headspace) and venting three times. (slowly venting to keep the contents from foaming out of the reactor). The $H_2$ regulator was set initially to 21 PSIG. Styrene, 462.2 g (4.44 mol.), was fed through a subsurface feed line (0.02" ID tip, 1.2 ft/s) against the hydrogen head pressure over a period of 116 minutes controlling the temperature at 90° C. and gradually increasing the hydrogen pressure to 41 PSIG. At the end of the styrene feed, the monomer feed line to the reactor, including the alumina columns, were flushed with 50 ml of anhydrous cyclohexane. The styrene feed and flush to the reactor was deemed complete when no further heat of reaction was observed generally signified by the permanent closing of the automated control valve on the coiling coils. During the course of the run the valve to the hydrogen regulator was periodically closed to verify uptake of hydrogen during the styrene feed. The reaction did take up hydrogen albeit very slowly.

The unquenched content of the reaction mixture was transferred to the wash vessel ($N_2$ atmosphere) previously charged with 300 ml of deoxygenated water heated to 65° C. and then washed with deoxygenated water (3×300 ml). This reaction mixture was then properly discarded upon separation of the aqueous quench. During the course of the transfer of the unquenched reaction mixture, a 10 ml aliquot of the unquenched reaction mixture was obtained. This colorless sample was full of uniformly suspended extremely finely divided solids. The sample was quenched with methanol resulting in the immediate production and evolution of hydrogen gas from the viscous mixture. GPC analyses of the sample using standard higher molecular weight columns and polystyrene standards was as follows: GPC MWD of $M_n$: 1030, $M_w$: 5635, $M_z$: 10,066 PD: 5.47, $\sigma_n$=2178, $_n\alpha_3$=4.13.

Examples 44-60

The experimental details of Examples 44-51 and Examples 52-60 (reaction conditions, reagent charges, and initial as well as final catalyst concentration), scale-up parameters (relative feeds and relative hourly feed rates) and results (polymer molecular weight distribution as determined by GPC and polymer yield) are presented in tabular form in Table VI and Table VII respectively. Examples 44-57 feature the use of recycle oligomer (comprised mainly of dimer>90%) recovered from a previous run or runs in forming the reaction mixture. Therefore for all the Examples 44-60 in order to simplify comparison of one Example to another, the GPC MWDs that are reported for the crude product distributions exclude the styrene dimer content. Product yields in excess of 100% represent a net incorporation of the organic chain transfer agent, which in these examples is ethylbenzene. In general the amount of dimer recovered was more than that which was charged in the recycle. Product yields of less than 100% represent a net production of ethylbenzene and/or dimer. SASH Catalyst Example 60 resulted in a 105% yield of the SASH PS polymer distribution and a 89% yield on the dimer stripped SASH PS product distribution. These Examples demonstrate that with uniform or near uniform hydrogen transfer to the condensed phase, temperatures above 75° C. are preferred such that organic chain transfer more successfully competes with chain transfer involving hydrogen. Among the inventive feature of this series of Examples is the relatively slow (15-20 minute) feed of the organolithium reagent under hydrogen atmosphere. This technique or charge protocol provides the most reproducible catalyst activity and run to run reproducibility. Examples 54 in combination with 55 as well as Example 60 are described in greater detail below.

Examples 54 and 55

Representative of Full Scale Monomer Feed Volume with Dimer Recycle for SASH Catalyst at 80° C.

A reaction solvent comprising anhydrous ethylbenzene, 336 ml (290.9 g, 2.74 mole) and a styrene oligomer mixture, 154 ml ($M_n$=227, 143.0 g. 0.63 mole) was formed to yield ca. 490 ml total. Of the solvent mixture 340 ml was charged to the reactor at 20° C. under a dry hydrogen (0 PSIG $H_2$) atmosphere. To the stirred solvent (800 RPM, three pitched blade turbines with Configuration III above) was charged through the charge vessel via positive nitrogen pressure, a solution previously formed from 4.01 g (0.0357 mol.) potassium t-butoxide, 69.9 g (0.66 mol) ethylbenzene, and 19.90 g (0.171 mol) of TMEDA. The charge vessel and transfer line to the reactor was flushed with a 50 ml portion of reaction solvent from the total amount above. Next, 18.91 ml (0.0378 mole) 2.0 M n-butyllithium was transferred through the charge vessel to the reactor followed by two 50 ml aliquots of the reaction solvent from the total amount above. At the outset of the 15 min feed of the organolithium reagent agitation was increased to 1130 RPM. During the organolithium charge the reactor pressure decreased to −3 PSIG. The reactor head space was purged with 50 PSIG with dry $H_2$ (through a subsurface feedline) and venting three times (slowly venting to keep the contents from foaming out of the reactor). The $H_2$ regulator was set to 18 PSIG and the reactor heated to 80° C. while feeding 1038.8 g (9.97 mol.) styrene. The styrene was fed through a subsurface feed line (0.02″ ID tip, 1.88 ft/s) against the hydrogen head pressure over a period of 163 minutes controlling the reaction temperature at 80° C. At the end of the styrene feed, the monomer feed line to the reactor, including the alumina columns (acidic alumina), were flushed with 50 ml of anhydrous ethylbenzene. The styrene feed and flush to the reactor was deemed complete when no further heat of reaction was observed generally signified by the permanent closing of the automated control valve on the coiling coils. During the course of the run the valve to the hydrogen regulator was periodically closed to verify uptake of hydrogen during the styrene feed. It was observed that for a brief period 62±10 min (ca. 41% of the styrene fed, 935 g of total reaction mass in reactor) the hydrogen uptake had slowed. However the hydrogen uptake was completely restored after a total of 508 g of the styrene (ca. 50% of the total styrene fed or ca. 1050 g of reaction mass in reactor) feed had been completed. Hydrogen uptake remained generally constant throughout the rest of the feed.

The unquenched polymerization reaction mixture was transferred with positive $H_2$ pressure to the wash vessel previously heated ($N_2$ atmosphere) and previously charged with 300 ml of deoxygenated water. Thus the reaction mixture is quenched with care in the wash reactor. The above process was repeated as Example 55 with the identical charges and conditions to within minor run to run variations in measuring out the reagents and reproducing the conditions.

During the transfer of the unquenched reaction mixtures (Examples 54 and 55) 10 ml samples of the individual reaction mixtures were obtained for analyses. The samples were red to in color and transparent to light with no settled or suspended solids. The samples were quenched by the addition of a drop of methanol from a transfer pipet. The methanol immediately quenches the red color and results in the immediate formation and evolution of hydrogen gas. GPC Analysis of the crude quenched reaction mixtures excluding the dimer content was as follows: Example 54 $M_n$: 533, $M_w$: 681, $M_z$: 892, PD: 1.278, $\sigma_n$=281, $_n\alpha_3$=2.086; Example 55 $M_n$: 555, $M_w$: 722, $M_z$: 961, PD: 1.301, $\sigma_n$=304, $_n\alpha_3$=2.100; thus demonstrating the robustness and run to run reproducibility of this SASH process of this invention.

The two phase product mixture formed from Examples 54 and 55 and the quench water was heated to 76° C. and then the phases were separated. Phase cuts were easily made at 76° C., and were rapid requiring little settling time. Water and any rag or emulsion was removed through the bottom drain valve. The pH of the wash water removed from the reactor was monitored, the first wash invariably had pH=14. Additional deoxygenated water washes (2×350 ml) were conducted until the removed water wash phase had a pH 10 indicating that all alkali metal had been removed. The water washed product mixture was stripped in the wash reactor of cyclohexane, TMEDA and ethylbenzene by normal distillation while gradually heating the wash reactor's jacket temperature to 165° C. The distillation was deemed complete when the pot temperature reached a temperature above 140° C. The solution was allowed to cool before collecting 3271 g of solution. The solution was then further stripped of ethylbenzene and TMEDA with the use of a wiped film evaporator (WFE, 2" glass Pope Still, operated at 50.0 mmHg vacuum, 140° C., wiper speed 60% of full rate, feeding at 1.0 liters/hr). This first WFE operation produced 2299.8 g SASH PS distribution having GPC MWD including dimer of $M_n$: 416, $M_w$: 610, $M_z$: 884, PD: 1.466, $\sigma_n$= 284, $_n\alpha_3$=2.251; excluding dimer of $M_n$: 547, $M_w$: 705, $M_z$: 932, PD: 1.289, $\sigma_n$=294, $_n\alpha_3$=2.122. A second WFE operation (0.1-0.3 mmHg vacuum, 172.5° C., wiper speed 60% of full rate, feeding at 1.0 liters/hr) provided 1790 g of a SASH PS distribution having 0.62 GPC area % styrene dimer content and a GPC MWD of $M_n$: 559, $M_w$: 719, $M_z$: 941, PD: 1.29, $\sigma_n$=299, $_n\alpha_3$=2.00.

Example 60

Representative of Full Scale Monomer Feed Volume for SASH Catalyst at 90° C.

Anhydrous ethylbenzene, 337 ml of 487 ml total, (422.13 g, 3.98 mol) was charged to the reactor at 20° C. under a dry hydrogen (3 PSIG $H_2$) atmosphere. To the stirred solvent (800 RPM, three pitched blade turbines with Configuration III above) was charged through the charge vessel via positive nitrogen pressure, a solution previously formed from 3.75 g (0.0324 mol.) potassium t-butoxide, 69.9 g (0.67 mol) ethylbenzene, 17.90 g (0.154 mol) of TMEDA. The charge vessel and transfer line to the reactor was flushed with a 50 ml portion of anhydrous ethylbenzene from the total amount above. Next, 21.88 ml (0.0438 mole) 2.0 M n-butyllithium was transferred through the charge vessel to the reactor followed by two 50 ml aliquots of anhydrous ethylbenzene from the total amount above. At the outset of the 15 min feed of the organolithium reagent agitation was increased to 1130 RPM. During the organolithium charge the reactor pressure decreased to 0 PSIG. The reactor head space was purged with 50 PSIG with dry $H_2$ (through a subsurface feedline) and venting three times (slowly venting to keep the contents from foaming out of the reactor). The $H_2$ regulator was set to 23 PSIG and the reactor heated to 90° C. while feeding 1044.9 g (10.03 mol.) styrene. The styrene was fed through a subsurface feed line (0.02" ID tip, 2.02 ft/s) against the hydrogen head pressure over a period of 153 minutes controlling the reaction temperature at 90° C. At the end of the styrene feed, the monomer feed line to the reactor, including the alumina columns, were flushed with 50 ml of anhydrous ethylbenzene. The styrene feed and flush to the reactor was deemed complete when no further heat of reaction was observed generally signified by the permanent closing of the automated control valve on the coiling coils. During the course of the run the valve to the hydrogen regulator was periodically closed to verify uptake of hydrogen during the styrene feed. It was observed that for a brief period 60±10 min (ca. 41% of the styrene fed, 910 g of total reaction mass in reactor) the hydrogen uptake had slowed. However the hydrogen uptake was completely restored after a total of 510 g of the styrene (ca. 50% of the total styrene fed or ca. 1000 g of reaction mass in reactor) feed had been completed. Hydrogen uptake remained generally constant throughout the rest of the feed.

The unquenched polymerization reaction mixture was transferred with positive $H_2$ pressure to the wash vessel previously heated ($N_2$ atmosphere) and previously charged with 300 ml of deoxygenated water. Thus the reaction mixture is quenched with care in the wash reactor. This two phase product mixture was heated to 76° C. and then the phases were separated. Phase cuts were easily made at 76° C., and were rapid requiring little settling time. Water and any rag or emulsion was removed through the bottom drain valve. The pH of the wash water removed from the reactor was monitored, the first wash invariably had pH=14. Additional deoxygenated water washes (2×300 ml) were conducted until the removed water wash phase had a pH 10 indicating that all alkali metal had been removed.

During the transfer of the unquenched reaction mixture a 10 ml sample of the reaction mixture was obtained for analysis. The sample was red to dark red in color and transparent to light with little to no settled or suspended solids. The sample was quenched by the addition of a drop of methanol which immediately quenches the red color and results in the immediate formation and evolution of hydrogen gas. GPC Analysis of the crude quenched reaction mixture was as follows: GPC MWD including dimer of $M_n$: 474, $M_w$: 718, $M_z$: 1070, PD: 1.516, $\sigma_n$=340, $_n\alpha_3$=2.369; excluding dimer of $M_n$: 590, $M_w$: 795, $M_z$: 1103, PD: 1.347, $\sigma_n$=348, $_n\alpha_3$=2.327. The water washed product mixture was stripped in the wash reactor of cyclohexane, TMEDA and ethylbenzene by normal distillation while gradually heating the wash reactor's jacket temperature to 165° C. The distillation was deemed complete when the pot temperature reached a temperature above 135° C. The solution was allowed to cool before collecting 1770 g of solution. The solution was then further stripped of ethylbenzene and TMEDA with the use of a wiped film evaporator (WFE, 2" glass Pope Still, operated at 50.0 mmHg vacuum, 140° C., 60% of full wiper speed, feeding at 1.0 liters/hr). This first WFE operation produced 1100.0 g SASH PS distribution having GPC MWD including dimer of $M_n$: 481, $M_w$: 724, $M_z$: 1070, PD: 1.506, $\sigma_n$=342, $_n\alpha_3$=2.319. A second WFE operation (0.1-0.3 mmHg vacuum, 172.5° C., 60% of full wiper speed, feeding at 1.0 liters/hr) provided 932.0 g of a SASH PS distribution having 0.47 GPC area % styrene dimer content and a GPC MWD of $M_n$: 605, $M_w$: 812, $M_z$: 1119, PD: 1.34, $\sigma_n$=354, $_n\alpha_3$=2.28. Additionally 165.49 g (15.8% of styrene charged) of a styrene oligomer mixture having $M_n$=222 was recovered.

ANALYTICAL METHODS

Molecular weight distributions in terms of $M_w$, $M_n$, $M_z$ and PD values for low molecular weight ($M_w$<1600 Daltons) were obtained by GPC using a Viscotek TDA modular system equipped with a UV detector, autosampler, pump, and temperature controlled column compartment. The columns used were Agilent Oligopore columns, 300 mm by 7.5 mm, part number 1113-6520. The solvent used was tetrahydrofuran, HPLC grade. The test procedure used entailed dissolving approximately 0.06-0.1 g of sample in 10 mL of THF. An aliquot of this solution is filtered and 200 µL is injected on the columns. Based on isolated 1,3-diphenylbutane(dimer) and 1,3,5-triphenylhexane (trimer) adducts, and the mode of separation is size exclusion, peaks are identified according to their order of elution as 1,3-diphenylbutane, 1,3,5-triphenylhexane, 1,3,5,7-tetraphenyloctane (tetramer), 1,3,5,7,9-pentaphenyldecane (pentamer), etc. The individual peaks of the oligomeric material are then assigned theoretical molecular weight values. A calibration curve is constructed using these theoretical values and their corresponding retention times. Based on this calibration, the overall distribution data is calculated and reported. The calculations were performed by the Viscotek Omnisec, version 4.2.0.237 gel permeation chromatography (GPC) data collection and processing system.

Molecular weight distributions in terms of $M_w$, $M_n$, $M_z$ and PD values for higher molecular weight ($M_w$>1600 Daltons) were obtained by GPC using a Viscotek TDA modular system equipped with a UV detector, autosampler, pump, and temperature controlled column compartment. The following three Agilent Technologies columns were used in series to perform the separation: (1) Oligopore column, 300 mm by 7.5 mm, part number 1113-6520, (1) Mixed Bed E, 300 mm×7.5 mm, part number 1110-6300, and (1) Mixed Bed D, 300 mm×7.5 mm, part number 1110-6504. The solvent used was tetrahydrofuran, HPLC grade. The test procedure used entailed dissolving approximately 0.06-0.1 g of sample in 10 mL of THF. An aliquot of this solution is filtered and 200 µL is injected on the columns. Based on isolated 1,3-diphenylbutane(dimer) and 1,3,5-triphenylhexane (trimer) adducts, and the mode of separation is size exclusion, peaks are identified according to their order of elution as 1,3-diphenylbutane, 1,3,5-triphenylhexane, 1,3,5,7-tetraphenyloctane (tetramer), 1,3,5,7,9-pentaphenyldecane (pentamer), etc. The individual peaks of the oligomeric material are then assigned theoretical molecular weight values. A calibration curve is constructed using these theoretical values and their corresponding retention times along with the retention times of polystyrene reference standards of known molecular weight. Based on this calibration, the overall distribution data is calculated and reported. As above the calculations were performed by the Viscotek Omnisec, version 4.2.0.237 gel permeation chromatography (GPC) data collection and processing system.

TABLE III

SASH catalyst in cyclohexane (CH), moderate temperature processes with high monomer to added organic chain transfer agent (ethylbenzene, EB) ratio.

| Patent Example | 4 | 5 | 6 | 7 | 8 | 9 |
|---|---|---|---|---|---|---|
| SASH Cat. Formed Temp, ° C. | 23° | 23° | 23° | 23° | 23° | 23° |
| Polymerization Temp. ° C. | 27 | 56 | 66 | 65 | 65 | 65 |
| Reactor Atmosphere | $H_2$ | $H_2$ | $H_2$ | $H_2$ | $H_2$ | $H_2$ |
| psig | 25 | 25 | 19 | 15 | 19 | 23 |
| Solvent | CH | CH | CH | CH | CH | CH |
| Total Mass, g | 725 | 584 | 390 | 312 | 390 | 390 |
| Catalyst | | | | | | |
| Potassium t-Butoxide, g | 11.2 | 5.64 | 3.27 | 1.98 | 2.78 | 3.08 |
| moles | 0.0998 | 0.0503 | 0.0291 | 0.0176 | 0.0248 | 0.0274 |
| Organic CTA | EB | EB | EB | EB | EB | EB |
| Mass, g | 1.06 | 5.32 | 3.56 | 22.00 | 20.64 | 20 |
| moles | 0.01 | 0.05 | 0.03 | 0.21 | 0.19 | 0.19 |
| vol, ml | 1.2 | 6.1 | 4.1 | 25 | 24 | 23 |
| TMEDA, g | 47 | 34.08 | 15 | 9.09 | 12.78 | 10.7 |
| moles | 0.404 | 0.293 | 0.129 | 0.078 | 0.11 | 0.092 |
| vol, ml | 60.65 | 43.97 | 19.35 | 11.73 | 16.49 | 13.81 |
| n-Butyllithium, Molarity in CH | 2 | 2 | 2 | 2 | 2 | 2 |
| vol, ml | 50 | 25.11 | 14.56 | 8.8 | 12.39 | 13.72 |
| moles | 0.1 | 0.0502 | 0.0291 | 0.0176 | 0.0248 | 0.0274 |
| Styrene, g | 200 | 730 | 911 | 1100 | 1032 | 534 |
| moles | 1.92 | 7.01 | 8.75 | 10.56 | 9.91 | 5.13 |
| vol, ml | 220 | 803 | 1002 | 1210 | 1135 | 587 |
| feed rate ml/min | 4.82 | 4.82 | 4.82 | 4.82 | 4.82 | 4.82 |
| time of feed, min | 46 | 167 | 208 | 251 | 236 | 122 |
| feed velocity ft/sec | 5.2 | 5.2 | 5.2 | 5.2 | 5.2 | 5.2 |
| Process Scale-Up Parameters | | | | | | |
| Total Charges initial, g. | 823 | 649 | 423 | 352 | 435 | 434 |
| Total Charges final, g | 1023 | 1379 | 1334 | 1452 | 1467 | 968 |
| Initial KH* concentration (ppm) | 4900 | 3100 | 2800 | 2000 | 2300 | 2500 |
| Final KH* concentration (ppm) | 3900 | 1500 | 900 | 500 | 700 | 1100 |
| mole TMEDA/Mol alkali metal | 2.20 | 2.92 | 3.10 | 2.22 | 2.22 | 1.67 |
| mole styrene/mole Li | 19 | 140 | 300 | 600 | 400 | 187 |
| mole sty/mole Li/hr | 25 | 50 | 87 | 143 | 102 | 92 |
| mole sty./mole Org. CTA | 192 | 140 | 260 | 51 | 51 | 27 |
| mole sty./hr/mole of Org. CTA | 252 | 50 | 75 | 12 | 13 | 13 |
| SASH PS Solvent Stripped polymer yield, g | 125 | 538 | 677 | 915 | 902 | 335 |
| yield % on monomer | 63% | 74% | 74% | 83% | 87% | 63% |
| $M_n$ | 357 | 392 | 455 | 976 | 631 | 475 |
| $M_w$ | 545 | 555 | 697 | 1869 | 1073 | 759 |
| Mz | 936 | 818 | 1044 | 3092 | 1855 | 1165 |
| $PD_n$ | 1.53 | 1.42 | 1.53 | 1.91 | 1.7 | 1.6 |
| $\sigma_n$ | 259.1 | 252.8 | 331.8 | 933.6 | 528.1 | 367.3 |
| $_n\alpha_3$ | 3.72 | 2.64 | 2.37 | 2.65 | 3.24 | 2.43 |

TABLE III-continued

SASH catalyst in cyclohexane (CH), moderate temperature processes with high monomer to added organic chain transfer agent (ethylbenzene, EB) ratio.

| Patent Example | 4 | 5 | 6 | 7 | 8 | 9 |
|---|---|---|---|---|---|---|
| SASH PS Dimer stripped polymer yield, g | na | 400 | 638.1 | na | 754.1 | 278.5 |
| yield % on monomer | na | 55% | 70% | na | 73% | 52% |
| $M_n$ | na | 479 | 483 | na | 724 | 617 |
| $M_w$ | na | 628 | 724 | na | 1134 | 865 |
| Mz | na | 861 | 1066 | na | 1615 | 1220 |
| $PD_n$ | na | 1.31 | 1.5 | na | 1.57 | 1.4 |
| $\sigma_n$ | na | 267 | 341 | na | 545 | 391 |
| $_n\alpha_3$ | na | 2.44 | 2.3 | na | 1.87 | 2.22 |

TABLE IV

SASH catalyst process in ethylbenzene (EB), moderate temperature relatively low monomer to total organic chain transfer agent ratio.

| Example | 10 | 11 | 12 | 13 | 14 | 15 | 16 | 17 | 18 | 19 |
|---|---|---|---|---|---|---|---|---|---|---|
| Temp Catalyst Formed | 20° | 20° | 20° | Rxn | Rxn | Rxn | Rxn | Rxn | Rxn | Rxn |
| Temperature, °C. | 65 | 65-70 | 70 | 70 | 67.5 | 75 | 75 | 75 | 70 | 70 |
| Atmosphere | $H_2$ | $H_2$ | $H_2$ | $H_2$ | $H_2$ | $H_2$ | $H_2$ | $H_2$ | $H_2$ | $H_2$ |
| psig | 16-18 | 15 | 15 | 15 | 15 | 15-18 | 23-25 | 25 | 24-26 | 24-26 |
| Solvent | EB | EB | EB | EB | EB | EB | EB | EB | EB | EB |
| Total Mass, g | 300 | 214 | 260 | 356 | 300 | 300 | 300 | 300 | 303.9 | 376 |
| Ethylbenzene moles | 2.83 | 2.02 | 2.45 | 3.35 | 2.83 | 2.83 | 2.83 | 2.83 | 2.86 | 3.54 |
| Catalyst | | | | | | | | | | |
| Potassium t-butoxide, g | 2.95 | 2.96 | 3 | 4.57 | 3.017 | 2.828 | 3.58 | 3.79 | 2.86 | 2.85 |
| moles | 0.0263 | 0.0264 | 0.0267 | 0.0407 | 0.0269 | 0.0252 | 0.0319 | 0.0338 | 0.0255 | 0.0254 |
| Organic CTA | EB | EB | EB | EB | EB | EB | EB | EB | EB | EB |
| Mass, g | 43.5 | 42.2 | 43.5 | 44 | 43.5 | 50 | 47.4 | 50.3 | 49.6 | 49.6 |
| moles | 0.41 | 0.4 | 0.41 | 0.42 | 0.41 | 0.47 | 0.45 | 0.47 | 0.47 | 0.47 |
| vol, ml | 50 | 49 | 50 | 51 | 50 | 58 | 55 | 58 | 57 | 57 |
| TMEDA Mass, g | 13.45 | 13.5 | 13.67 | 20.83 | 13.75 | 12.89 | 17.11 | 17.69 | 12.96 | 13.6 |
| moles | 0.116 | 0.116 | 0.118 | 0.179 | 0.118 | 0.111 | 0.147 | 0.152 | 0.112 | 0.117 |
| vol, ml | 17.35 | 17.42 | 17.64 | 26.88 | 17.74 | 16.63 | 22.08 | 22.83 | 16.72 | 17.55 |
| n-Butyllithium 2.0M CH, ml | 13.15 | 13.2 | 13.37 | 20.34 | 13.44 | 12.6 | 16 | 16.82 | 13 | 12.71 |
| moles | 0.0263 | 0.0264 | 0.0267 | 0.0407 | 0.0269 | 0.0252 | 0.032 | 0.0336 | 0.026 | 0.0254 |
| Monomer: Styrene, g | 1000 | 1100 | 1050 | 800 | 1050 | 1050 | 1020 | 1051 | 1054 | 1059 |
| moles | 9.6 | 10.56 | 10.08 | 7.68 | 10.08 | 10.08 | 9.79 | 10.09 | 10.12 | 10.17 |
| vol, ml | 1100 | 1210 | 1155 | 880 | 1155 | 1155 | 1122 | 1156 | 1159 | 1165 |
| feed rate ml/min | 4.82 | 4.82 | 4.82 | 4.82 | 4.82 | 4.82 | 6.2 | 6.2 | 4.93 | 4.93 |
| time of feed, min | 228 | 251 | 240 | 183 | 240 | 240 | 181 | 185 | 237 | 238 |
| feed velocity ft/sec | 5.2 | 5.2 | 5.2 | 5.2 | 5.2 | 5.2 | 5.3 | 5.3 | 5.3 | 5.3 |
| ProcessScale-Up Parameters | | | | | | | | | | |
| Total Charge initial, g. | 370 | 283 | 331 | 441 | 371 | 376 | 381 | 385 | 379 | 452 |
| Total Charge final, g | 1370 | 1383 | 1381 | 1241 | 1421 | 1426 | 1401 | 1436 | 1433 | 1511 |
| Initial KH* conc. ppm | 2850 | 3744 | 3245 | 3698 | 2908 | 2692 | 3373 | 3506 | 2749 | 2256 |
| Final KH* conc. ppm | 770 | 766 | 777 | 1315 | 759 | 709 | 916 | 940 | 728 | 675 |
| mole styrene/mole Li | 365 | 400 | 377 | 189 | 375 | 400 | 306 | 300 | 389 | 400 |
| mole sty/mole Li/hr | 96 | 96 | 94 | 62 | 94 | 100 | 101 | 97 | 99 | 101 |
| mole sty./mole Org. CTA | 2.97 | 4.38 | 3.53 | 2.04 | 3.12 | 3.06 | 2.99 | 3.06 | 3.04 | 2.54 |
| mole styr/hr/mole Org. CTA | 0.78 | 1.05 | 0.88 | 0.67 | 0.78 | 0.77 | 0.99 | 0.99 | 0.77 | 0.64 |
| SASH PS Solv. Strip. polymer yield, g | 943 | 1033 | 1077 | 828 | 1050 | 1108 | 1083 | 1133 | 1150 | 1113 |
| yield % on monomer | 94% | 94% | 103% | 103% | 100% | 106% | 106% | 108% | 109% | 105% |
| $M_n$ | 467 | 507 | 512 | 367 | 560 | 534 | 485 | 422 | 526 | 583 |
| $M_w$ | 720 | 815 | 794 | 497 | 914 | 829 | 735 | 601 | 848 | 1056 |
| Mz | 1073 | 1225 | 1166 | 695 | 1344 | 1193 | 1091 | 871 | 1253 | 1588 |
| $PD_n$ | 1.54 | 1.61 | 1.55 | 1.35 | 1.63 | 1.55 | 1.52 | 1.42 | 1.61 | 1.81 |
| $\sigma_n$ | 344 | 395 | 380 | 218 | 445 | 397 | 348 | 275 | 412 | 525 |
| $_n\alpha_3$ | 2.3 | 2.24 | 2.15 | 2.38 | 2.03 | 1.98 | 2.33 | 2.41 | 2.1 | 2.05 |
| SASH PS Dimer Strip. polymer yield, g | 817 | 891 | 958 | 609 | 925 | 978 | 929 | 919 | 1011 | 1022 |
| yield % on monomer | 82% | 81% | 91% | 76% | 88% | 93% | 91% | 87% | 96% | 97% |
| $M_n$ | 575 | 629 | 615 | 486 | 728 | 662 | 607 | 540 | 683 | 801 |
| $M_w$ | 805 | 895 | 859 | 593 | 1019 | 917 | 798 | 684 | 942 | 1197 |
| Mz | 1126 | 1248 | 1181 | 750 | 1380 | 1243 | 1058 | 891 | 1280 | 1665 |
| $PD_n$ | 1.4 | 1.42 | 1.40 | 1.22 | 1.40 | 1.39 | 1.31 | 1.27 | 1.38 | 1.49 |
| $\sigma_n$ | 364 | 409 | 387 | 228 | 460 | 411 | 340 | 279 | 421 | 563 |
| $_n\alpha_3$ | 2.14 | 2.02 | 1.97 | 2.15 | 1.8 | 1.86 | 1.97 | 2.11 | 1.91 | 1.79 |

TABLE V

SASH catalyst process in mixed solvent systems ethylbenzene (EB) with or without cyclohexane with recycle dimer oligomer mixture.

| Patent Example | 20 | 21 | 22 | 23 | 24 | 25 | 26 | 27 | 28 |
|---|---|---|---|---|---|---|---|---|---|
| Temp Catalyst Formed | 23° | 23° | 23° | 23° | 23° | 23° | 23° | 23° | 23° |
| Rxn. Temperature, ° C. | 75 | 75 | 75 | 70 | 72 | 72 | 72 | 72 | 72 |
| Atmosphere | $H_2$ | $H_2$ | $H_2$ | $H_2$ | $H_2$ | $H_2$ | $H_2$ | $H_2$ | $H_2$ |
| psig | 16-18 | 18-20 | 21-25 | 25 | 20 | 20 | 20-30 | 20-30 | 20-30 |
| Solvent | EB | EB | EB | EB & CH | EB & CH | EB & CH | EB & CH | EB & CH | EB & CH |
| Solvent mass, g | 216 | 175 | 179.6 | 294 | 281.6 | 240.1 | 238 | 241.9 | 238 |
| Contained Ethylbenzene moles | 2.03 | 1.65 | 1.69 | 1.54 | 1.46 | 0.85 | 0.85 | 0.86 | 0.85 |
| Recyle oligomer $M_n$ | 210 | 210 | 215 | 209 | 234 | 199 | 199 | 199 | 199 |
| Mass, g | 100.6 | 138 | 145.07 | 63.15 | 93.46 | 93.85 | 96.01 | 92.09 | 96.01 |
| moles | 0.48 | 0.66 | 0.67 | 0.3 | 0.4 | 0.47 | 0.48 | 0.46 | 0.48 |
| Catalyst | | | | | | | | | |
| Potassium t-Butoxide, g | 2.828 | 2.662 | 2.52 | 3.12 | 3.51 | 3.078 | 3.13 | 3.08 | 3.18 |
| moles | 0.0252 | 0.0237 | 0.0225 | 0.0278 | 0.0313 | 0.0274 | 0.0279 | 0.0274 | 0.0283 |
| EB, g | 50 | 42 | 47.4 | 51.6 | 51.5 | 51.5 | 58.5 | 61.6 | 53.6 |
| moles | 0.47 | 0.4 | 0.45 | 0.49 | 0.49 | 0.49 | 0.55 | 0.58 | 0.51 |
| vol, ml | 58 | 48 | 55 | 60 | 59 | 59 | 67 | 71 | 62 |
| TMEDA, g | 12.89 | 12.13 | 11.45 | 14.25 | 15.98 | 15.98 | 14.2 | 15.62 | 15.32 |
| moles | 0.111 | 0.104 | 0.099 | 0.123 | 0.138 | 0.138 | 0.122 | 0.134 | 0.132 |
| vol, ml | 16.63 | 15.65 | 14.77 | 18.39 | 20.62 | 20.62 | 18.32 | 20.15 | 19.77 |
| n-Butyllithium, Molarity | 2 | 2 | 2 | 2 | 2 | 2 | 2 | 2 | 2 |
| vol, ml | 12.6 | 11.86 | 11.2 | 13.6 | 15.63 | 13.91 | 14.81 | 14.81 | 14.81 |
| moles | 0.0252 | 0.0237 | 0.0224 | 0.0272 | 0.0313 | 0.0278 | 0.0296 | 0.0296 | 0.0296 |
| Monomer: Styrene, g | 1057 | 1055 | 1057 | 1011.4 | 1172.5 | 1011 | 1019 | 1003.2 | 1006 |
| moles | 10.15 | 10.13 | 10.15 | 9.71 | 11.26 | 9.71 | 9.78 | 9.63 | 9.66 |
| vol, ml | 1163 | 1161 | 1163 | 1113 | 1290 | 1112 | 1121 | 1104 | 1107 |
| feed rate ml/min | 4.82 | 4.82 | 4.82 | 4.93 | 4.93 | 4.93 | 4.93 | 4.93 | 4.93 |
| time of feed, min | 241 | 241 | 241 | 227 | 263 | 227 | 229 | 225 | 226 |
| feed rate g/min | 4.38 | 4.38 | 4.38 | 4.45 | 4.45 | 4.45 | 4.45 | 4.45 | 4.45 |
| feed velocity ft/sec | 5.2 | 5.2 | 5.2 | 5.3 | 5.3 | 5.3 | 5.3 | 5.3 | 5.3 |
| Process Scale-Up Parameters | | | | | | | | | |
| Total Charge initial, g. | 389 | 376 | 392 | 434 | 455 | 412 | 418 | 423 | 414 |
| Total Charge final, g | 1446 | 1431 | 1449 | 1445 | 1627 | 1423 | 1437 | 1426 | 1420 |
| Initial KH* conc. ppm | 2597 | 2528 | 2291 | 2516 | 2758 | 2707 | 2841 | 2811 | 2867 |
| Final KH* conc. ppm | 699 | 665 | 620 | 755 | 771 | 784 | 827 | 833 | 836 |
| mole styrene/mole Li | 403 | 427 | 453 | 357 | 360 | 349 | 330 | 325 | 326 |
| mole sty/mole Li/hr | 100 | 106 | 113 | 94 | 82 | 92 | 87 | 87 | 87 |
| mole sty./mole Org. CTA | 3.4 | 3.75 | 3.61 | 4.17 | 4.81 | 5.36 | 5.21 | 5.06 | 5.27 |
| mole styr/hr/mole Org. CTA | 0.85 | 0.93 | 0.9 | 1.1 | 1.1 | 1.42 | 1.36 | 1.35 | 1.4 |
| SASH PS Solv. Strip, poly. yield, g | 1074 | 1070 | 1105 | 1065 | 1289 | 2162[2] | | 2257[2] | |
| yield % on monomer[1] | 102% | 101% | 105% | 99% | 102% | 98% | | 103% | |
| $M_n$ | 590 | 599 | 640 | 784 | 744 | 649 | 694 | 685 | 605 |
| $M_w$ | 772 | 791 | 869 | 1165 | 1045 | 990 | 1045 | 1012 | 889 |
| Mz | 1026 | 1058 | 1176 | 1620 | 1390 | 1383 | 1439 | 1375 | 1219 |
| $PD_n$ | 1.31 | 1.32 | 1.36 | 1.49 | 1.4 | 1.52 | 1.51 | 1.48 | 1.47 |
| $\sigma_n$ | 328 | 339 | 383 | 547 | 473 | 470 | 494 | 473 | 414 |
| $_n\alpha_3$ | 2.04 | 2.04 | 1.97 | 1.81 | 1.59 | 1.77 | 1.68 | 1.62 | 1.72 |
| SASH PS Dimer Strip. polymer yield, g | 993 | 1034.5 | 1040.3 | 955.29 | 1169 | 1909 | | 1969.17 | |
| yield % on monomer[1] | 94% | 98% | 98% | 94% | 100% | 94% | | 98% | |
| $M_n$ | 596 | 598 | 644 | 800 | 750 | 750 | | 724 | |
| $M_w$ | 769 | 783 | 875 | 1193 | 1053 | 1085 | | 1011 | |
| Mz | 990 | 1013 | 1181 | 1651 | 1395 | 1508 | | 1364 | |
| $PD_n$ | 1.29 | 1.309 | 1.359 | 1.491 | 1.404 | 1.447 | | 1.396 | |
| $\sigma_n$ | 321 | 333 | 386 | 561 | 477 | 501 | | 456 | |
| $_n\alpha_3$ | 1.742 | 1.685 | 1.934 | 1.754 | 1.556 | 1.905 | | 1.769 | |

[1]Yield % adjusted for charged and recovered dimer oligomer mixture charged.
[2]Examples 25 and 26 as well as Examples 27 and 28 were combined in the wash kettle before work up and isolation.

TABLE VI

SASH catalyst process with initial catalyst formed from anionic polystyrene leaving a heel to form subsequent reaction mixtures.

| Example | 29 | 30 | 31 | 32 | 33 | 34 | 35 | Composite 36 |
|---|---|---|---|---|---|---|---|---|
| Temp Catalyst Formed Rxn. | 19 | 30 | 30 | 30 | 30 | 30 | 30 | 30 |
| Temperature, ° C. | 72 | 72 | 72 | 72 | 72 | 72 | 72 | 72 |
| Atmosphere | $H_2$ | $H_2$ | $H_2$ | $H_2$ | $H_2$ | $H_2$ | $H_2$ | $H_2$ |
| psig | 30 | 73 | 73 | 73 | 73 | 73 | 73 | 73 |

TABLE VI-continued

SASH catalyst process with initial catalyst formed from anionic polystyrene leaving a heel to form subsequent reaction mixtures.

| Example | 29 | 30 | 31 | 32 | 33 | 34 | 35 | Composite 36 |
|---|---|---|---|---|---|---|---|---|
| CH solvent, g. | 351 | 273 | 195 | 195 | 195 | 273 | 273 | 1404 |
| vol, ml | 450 | 350 | 250 | 250 | 250 | 350 | 350 | 1802 |
| Catalyst | | | | | | | | |
| CH Solvent, g. | 85.1 | 85.1 | 86.1 | 88.4 | 90.9 | 92.6 | 92.2 | 535 |
| vol, ml | 109 | 109 | 110 | 113 | 117 | 119 | 118 | 687 |
| Potassium t-Butoxide, g | 3.63 | 3.63 | 3.67 | 3.77 | 3.88 | 3.96 | 3.94 | 22.86 |
| moles | 0.0324 | 0.0324 | 0.0327 | 0.0336 | 0.0346 | 0.0353 | 0.0351 | 0.204 |
| Aromatic hydrocarbon | In Situ APS | SASH Heel | SASH Heel | SASH Heel | SASH Heel | SASH Heel | SASH Heel | SASH Heel |
| Mass, g | 25.00 | 82.00 | 82.00 | 82.00 | 82.00 | 82.00 | 82.00 | 492.00 |
| vol, ml | — | 100 | 100 | 100 | 100 | 100 | 100 | 100 |
| TMEDA, Mass, g | 19.6 | 19.6 | 19.8 | 20.4 | 20.9 | 21.3 | 21.2 | 123.29 |
| moles | 0.169 | 0.169 | 0.171 | 0.175 | 0.180 | 0.184 | 0.183 | 1.06 |
| vol, ml | 25.29 | 25.29 | 25.58 | 26.27 | 27.02 | 27.53 | 27.39 | 159.08 |
| n-Butyllithium, M | 2.0 | 2.0 | 2.0 | 2.0 | 2.0 | 2.0 | 2.0 | 2.00 |
| vol, ml | 16.27 | 16.11 | 16.29 | 16.91 | 17.48 | 17.66 | 17.54 | 101.99 |
| moles | 0.0325 | 0.0322 | 0.0326 | 0.0338 | 0.0350 | 0.0353 | 0.0351 | 0.20 |
| Monomer: styrene, g | 316.4 | 912.4 | 909.9 | 910.8 | 911.2 | 910.8 | 909.0 | 5464.10 |
| moles | 3.04 | 8.76 | 8.74 | 8.75 | 8.75 | 8.75 | 8.73 | 52.46 |
| vol, ml | 348 | 1004 | 1001 | 1002 | 1002 | 1002 | 1000 | 6011.11 |
| feed rate ml/min | 4.93 | 4.93 | 4.93 | 4.93 | 4.93 | 4.93 | 4.93 | 4.93 |
| time of feed, min | 71 | 205 | 204 | 205 | 205 | 205 | 204 | 205 |
| feed rate g/min | 4.45 | 4.45 | 4.45 | 4.45 | 4.45 | 4.45 | 4.45 | 4.45 |
| feed velocity ft/sec | 5.3 | 5.3 | 5.3 | 5.3 | 5.3 | 5.3 | 5.3 | 5.30 |
| Process Scale-Up Parameters | | | | | | | | |
| mole Li/Mole K | 1.005 | 0.995 | 0.995 | 1.005 | 1.010 | 1.002 | 1.000 | 1.00 |
| Total Charge intial, g. | 496 | 476 | 399 | 403 | 406 | 487 | 486 | 1526 |
| Total Charge final, g | 813 | 1388 | 1309 | 1313 | 1318 | 1397 | 1395 | 6990 |
| Initial KH* concentration ppm | 2628 | 2716 | 3274 | 3369 | 3450 | 2911 | 2896 | 5362 |
| Final KH* concentration ppm | 1605 | 931 | 998 | 1033 | 1064 | 1014 | 1009 | 1170 |
| mole styrene/mole Li | 93 | 272 | 268 | 259 | 250 | 248 | 249 | 257 |
| mole sty/mole Li/hr | 79 | 80 | 79 | 76 | 73 | 73 | 73 | 75 |
| GPC SASH PS, | | | | | | | | Solvent Stripped |
| $M_n$ | 351 | 401 | 423 | 409 | 482 | 341 | 380 | 428 |
| $M_w$ | 706 | 637 | 659 | 626 | 793 | 511 | 567 | 663 |
| Mz | 1331 | 1067 | 1025 | 989 | 1233 | 865 | 895 | 1050 |
| $PD_n$ | 2.01 | 1.59 | 1.56 | 1.53 | 1.65 | 1.50 | 1.49 | 1.55 |
| $\sigma_n$ | 353 | 308 | 316 | 298 | 387 | 241 | 267 | 317 |
| $_n\alpha_3$ | 3.53 | 3.24 | 2.64 | 2.87 | 2.46 | 3.71 | 3.01 | 2.83 |
| GPC excluding Dimer | | | | | | | | Dimer Stripped |
| $M_n$ | na | 552 | 566 | 547 | 636 | 491 | 519 | 558 |
| $M_w$ | na | 760 | 768 | 733 | 900 | 655 | 681 | 763 |
| Mz | na | 1126 | 1078 | 1044 | 1276 | 967 | 962 | 1100 |
| $PD_n$ | na | 1.38 | 1.36 | 1.34 | 1.42 | 1.33 | 1.31 | 1.37 |
| $\sigma_n$ | na | 339 | 338 | 319 | 410 | 284 | 290 | 338 |
| $_n\alpha_3$ | na | 2.93 | 2.41 | 2.71 | 2.22 | 3.24 | 2.84 | 2.66 |

Table VII

Less Preferred SASH Catalyst Hydrogen Mediated Anionic Chain Transfer Styrene Polymerization Examples.

| Example | 37 | 38 | 39 | 40 | 41 | 42 | 43 |
|---|---|---|---|---|---|---|---|
| Rxn. Temperature, ° C. | Rxn 72 | Room 35 | Rxn 72 | Rxn 72 | Rxn 72 | Rxn 75 | Rxn 90 |
| Atmosphere | $H_2$ | $H_2$ | $H_2$ | $H_2$ | $H_2$ | $H_2$ | $H_2$ |
| psig | 20 | 15 | 20 | 20 | 20 | 25 | 21-40 |
| Solvent | CH & m-Xylene | EB | EB & CH | EB & CH | EB & CH | EB | EB |
| Mass, g | 411.5 | 356 | 240.0 | 240.1 | 309.8 | 302.0 | 500 |
| Aromatic Hydrocarbon, moles | 1.98 | 3.35 | 1.29 | 0.85 | 2.92 | 2.84 | 4.7 |
| Recycle $M_n$ | 0 | 0 | 215 | 199 | 0 | 0 | 0 |
| Mass, g | 0.00 | 0 | 98.83 | 93.85 | 0.00 | 0.00 | 0.00 |
| moles | 0.00 | 0.00 | 0.46 | 0.47 | 0.00 | 0.00 | 0.00 |
| Alkali metal saline hydride | K | K | $NaK_2$ | $NaK_2$ | Na | Li | Li |
| Alkali metal alkoxide, g | 3.13 | 4.57 | 3.44 | 3.51 | 2.90 | 2.64 | 3.92 |
| moles | 0.0279 | 0.0407 | 0.0318 | 3.0820 | 0.0302 | 0.0330 | 0.0489 |
| Solvent to form alkoxide solution | m-Xylene | EB | EB | EB | EB | EB | EB |

Table VII-continued

Less Preferred SASH Catalyst Hydrogen Mediated Anionic Chain Transfer Styrene Polymerization Examples.

| Example | 37 | 38 | 39 | 40 | 41 | 42 | 43 |
|---|---|---|---|---|---|---|---|
| Mass, g | 42.2 | 44 | 55.3 | 51.5 | 51.5 | 51.5 | 69.9 |
| moles | 0.40 | 0.42 | 0.52 | 0.49 | 0.49 | 0.49 | 0.66 |
| vol, ml | 49 | 51 | 64 | 59 | 59 | 59 | 81 |
| TMEDA, g. | 17.16 | 20.83 | 16.20 | 16.51 | 15.98 | 18.00 | 23.50 |
| moles | 0.148 | 0.179 | 0.139 | 0.142 | 0.138 | 0.155 | 0.202 |
| vol, ml | 22.14 | 26.88 | 20.90 | 21.30 | 20.62 | 23.23 | 30.33 |
| n-Butyllithium, Molarity | 2.0 | 2.0 | 2.0 | 2.0 | 2.0 | 2.0 | 2.0 |
| vol, ml | 14.81 | 20.34 | 15.91 | 14.40 | 15.63 | 16.50 | 29.62 |
| moles | 0.0296 | 0.0407 | 0.0318 | 0.0288 | 0.0313 | 0.0330 | 0.0592 |
| Monomer: styrene, g | 1000 | 800 | 1160 | 1000 | 520 | 338 | 462.2 |
| moles | 9.60 | 7.68 | 11.14 | 9.60 | 4.99 | 3.25 | 4.44 |
| vol, ml | 1100 | 880 | 1276 | 1100 | 572 | 372 | 508 |
| feed rate ml/min | 4.93 | 4.82 | 4.92 | 4.92 | 4.92 | 4.92 | 4.40 |
| time of feed, min | 225 | 183 | 261 | 225 | 117 | 76 | 116 |
| feed rate g/min | 4.45 | 4.38 | 4.44 | 4.44 | 4.44 | 4.44 | 4.00 |
| feed velocity ft/sec | 5.3 | 5.2 | 5.3 | 5.3 | 5.3 | 5.3 | 1.2 |
| Solvent strip. polymer yield, g | 1027 | 708 | 1263 | 1102 | na | na | na |
| yield % on monomer | 102.7% | 88.5% | 100.3% | 100.8% | na | na | na |
| $M_n$ | 727 | 648 | 762 | 637 | 5,713 | 2,593 | 1030 |
| $M_w$ | 1135 | 1331 | 1793 | 1260 | 17,796 | 6,855 | 5635.0 |
| Mz | 1532 | 2490 | 3824 | 2341 | 28,410 | 10,991 | 10,066 |
| $PD_n$ | 1.561 | 2.054 | 2.353 | 1.978 | 3.115 | 2.644 | 5.471 |
| $\sigma_n$ | 545 | 665 | 886 | 630 | 8308 | 3324 | 2178 |
| $_n\alpha_3$ | 1.442 | 3.448 | 4.288 | 3.448 | 2.648 | 2.503 | 4.131 |
| Dimer strip. polymer yield, g | 977.14 | 629.5 | 1140 | 970.6 | na | na | na |
| yield % on monomer | 98% | 79% | 98% | 97% | na | na | na |
| $M_n$ | 805 | 816 | na | 605 | na | 2375* | na |
| $M_w$ | 1169 | 1364 | na | 1270 | na | 6887 | na |
| Mz | 1535 | 2222 | na | 2431 | na | 11071 | na |
| $PD_n$ | 1.452 | 1.672 | na | 2.099 | na | 2.900 | na |
| $\sigma_n$ | 541 | 669 | na | 634 | na | 3274 | na |
| $_n\alpha_3$ | 1.357 | 2.793 | na | 3.590 | na | 2.604 | na |

*Small portion stripped of solvent in a Kugelrohr short path distillation apparatus.

TABLE VIII

SASH PS catalyzed process w/more uniform hydrogen transfer to condensed phase, w/recycle and with high velocity feed.

| Example | 44 | 45 | 46 | 47 | 48 | 49 | 50 | 51 |
|---|---|---|---|---|---|---|---|---|
| Temp Catalyst Formed | 20 | 20 | 20 | 20 | 20 | 20 | 20 | 20 |
| Temperature, ° C. | 73 | 73 | 73 | 73 | 73 | 73 | 73 | 73 |
| Atmosphere | $H_2$ | $H_2$ | $H_2$ | $H_2$ | $H_2$ | $H_2$ | $H_2$ | $H_2$ |
| psig | 20 | 20 | 20 | 20 | 20 | 20 | 20 | 20 |
| Ethylbenzene, g. | 219.8 | 219.8 | 288.8 | 281.2 | 281.2 | 281.2 | 273.1 | 273.1 |
| mole | 2.07 | 2.07 | 2.72 | 2.65 | 2.65 | 2.65 | 2.57 | 2.57 |
| vol, ml | 253 | 253 | 333 | 324 | 324 | 324 | 315 | 315 |
| Dimer $M_n$ | 227 | 227 | 227 | 227 | 210 | 210 | 210 | 210 |
| Mass, g. | 108.24 | 108.24 | 61.25 | 59.64 | 59.64 | 59.64 | 57.93 | 57.93 |
| mole | 0.48 | 0.48 | 0.27 | 0.26 | 0.28 | 0.28 | 0.28 | 0.28 |
| vol, ml | 116 | 116 | 66 | 64 | 64 | 64 | 113 | 113 |
| Potassium t-butoxide | 3.86 | 3.82 | 3.80 | 3.59 | 2.96 | 2.99 | 2.95 | 2.85 |
| mole | 0.0344 | 0.0340 | 0.0338 | 0.0320 | 0.0264 | 0.0266 | 0.0263 | 0.0254 |
| Etyhylbenzene, g. | 67.7 | 68.1 | 66.9 | 63.9 | 51.8 | 53.2 | 52.6 | 50.8 |
| mole | 0.64 | 0.64 | 0.63 | 0.60 | 0.49 | 0.50 | 0.50 | 0.48 |
| vol, ml | 78 | 79 | 77 | 74 | 60 | 61 | 61 | 59 |
| TMEDA, g. | 18.14 | 17.95 | 17.47 | 16.86 | 13.54 | 14.03 | 13.86 | 13.39 |
| mole | 0.156 | 0.154 | 0.150 | 0.145 | 0.117 | 0.121 | 0.119 | 0.115 |
| vol, ml | 23.40 | 23.16 | 22.55 | 21.75 | 17.47 | 18.11 | 17.88 | 17.28 |
| n-Butyllithium, M | 2.0 | 2.0 | 2.0 | 2.0 | 2.0 | 2.0 | 2.0 | 2.0 |
| vol, ml | 18.06 | 17.26 | 17.76 | 16.10 | 13.28 | 13.61 | 13.48 | 12.71 |
| mole | 0.0361 | 0.0345 | 0.0355 | 0.0322 | 0.0266 | 0.0272 | 0.0270 | 0.0254 |
| Monomer: styrene, g. | 1124.4 | 1060.6 | 1054.4 | 1058 | 1058 | 1055.1 | 1053.8 | 1052.4 |
| mole | 10.80 | 10.18 | 10.12 | 10.16 | 10.16 | 10.13 | 10.12 | 10.10 |
| vol, ml | 1237 | 1167 | 1160 | 1164 | 1164 | 1161 | 1159 | 1158 |
| feed rate ml/min | 6.2 | 6.2 | 6.2 | 6.2 | 5.0 | 5.0 | 5.0 | 5.0 |

TABLE VIII-continued

SASH PS catalyzed process w/more uniform hydrogen transfer to condensed phase, w/recycle and with high velocity feed.

| Example | 44 | 45 | 46 | 47 | 48 | 49 | 50 | 51 |
|---|---|---|---|---|---|---|---|---|
| time of feed, min | 200 | 188 | 187 | 188 | 233 | 232 | 232 | 232 |
| feed rate g/min | 5.64 | 5.64 | 5.64 | 5.64 | 4.55 | 4.55 | 4.55 | 4.55 |
| feed velocity ft/s | 13.7 | 13.7 | 13.7 | 13.7 | 11.0 | 11.0 | 11.0 | 11.0 |
| Process Scale-Up Parameters | | | | | | | | |
| mole lithium/mole potassium | 1.05 | 1.01 | 1.05 | 1.01 | 1.01 | 1.02 | 1.03 | 1.00 |
| Mole TMEDA/mole alkali | 2.21 | 2.25 | 2.17 | 2.26 | 2.20 | 2.24 | 2.24 | 2.27 |
| Total Charge initial, g. | 432 | 431 | 452 | 438 | 419 | 422 | 411 | 408 |
| Total Charge final, g. | 1556 | 1492 | 1506 | 1496 | 1477 | 1477 | 1465 | 1460 |
| Initial KH* conc. ppm | 3355 | 3210 | 3152 | 2951 | 2540 | 2590 | 2633 | 2500 |
| Final KH* conc. ppm | 931 | 928 | 946 | 863 | 721 | 739 | 739 | 698 |
| mole styrene/mole Li | 299 | 295 | 285 | 316 | 383 | 372 | 375 | 397 |
| mole sty/mole Li/hr | 90 | 94 | 91 | 101 | 99 | 96 | 97 | 103 |
| mole sty./mole Org. CTA | 3.39 | 3.19 | 2.80 | 2.89 | 2.97 | 2.95 | 3.03 | 3.04 |
| mole sty./hr/mole Org. CTA | 1.02 | 1.02 | 0.90 | 0.92 | 0.77 | 0.76 | 0.78 | 0.79 |
| GPC MWD trimer and above | | | | | | | | |
| $M_n$ | 698 | 570 | 605 | 550 | 589 | 576 | 559 | 634 |
| $M_w$ | 993 | 745 | 799 | 710 | 773 | 747 | 721 | 865 |
| Mz | 1355 | 985 | 1053 | 930 | 1013 | 972 | 940 | 1163 |
| $PD_n$ | 1.423 | 1.307 | 1.321 | 1.291 | 1.312 | 1.297 | 1.290 | 1.364 |
| $\sigma_n$ | 454 | 316 | 343 | 297 | 329 | 314 | 301 | 383 |
| $_n\alpha_3$ | 2.067 | 2.087 | 2.075 | 2.085 | 2.072 | 2.072 | 2.079 | 2.077 |
| EB Strip. SASH PS, g. | 2064.9 | | 2004.3 | | 2025.3 | | 1991.0 | |
| polymer yield %, g | 86% | | 90% | | 91% | | 90% | |
| Dimer strip. polymer yield, g | 1671 | | 1609 | | 1639 | | 1611 | |
| yield % on monomer | 76% | | 76% | | 78% | | 77% | |
| $M_n$ | 613 | | 586 | | 610 | | 599 | |
| $M_w$ | 824 | | 766 | | 794 | | 799 | |
| Mz | 1102 | | 999 | | 1038 | | 1057 | |
| $PD_n$ | 1.34 | | 1.31 | | 1.30 | | 1.33 | |
| $\sigma_n$ | 360 | | 325 | | 335 | | 346 | |
| $_n\alpha_3$ | 1.90 | | 1.80 | | 1.87 | | 1.83 | |

TABLE IX

SASH catalyzed process w/uniform hydrogen transfer to condensed phase, w/or w/o recycle and with low velocity feed

| Example | 52 | 53 | 54 | 55 | 56 | 57 | 58 | 59 | 60 |
|---|---|---|---|---|---|---|---|---|---|
| Temp Catalyst Formed | Rxn | Rxn | Rxn | Rxn | Rxn | Rxn | Rxn | Rxn | Rxn |
| Temperature, ° C. | 78 | 80 | 80 | 80 | 85 | 90 | 90 | 90 | 90 |
| Atmosphere | $H_2$ | $H_2$ | $H_2$ | $H_2$ | $H_2$ | $H_2$ | $H_2$ | $H_2$ | $H_2$ |
| psig | 15 | 15 | 18 | 18 | 21 | 21 | 21 | 21 | 21 |
| Ethylbenzene, g. | 188.6 | 188.0 | 290.9 | 308.3 | 303.2 | 296.8 | 433.5 | 434.2 | 422.1 |
| mole | 1.78 | 1.77 | 2.74 | 2.90 | 2.86 | 2.80 | 4.08 | 4.09 | 3.98 |
| vol, ml | 218 | 217 | 336 | 356 | 350 | 342 | 500 | 501 | 487 |
| Dimer $M_n$ | 227 | 227 | 227 | 227 | 227 | 227 | na | na | na |
| Mass, g | 125.39 | 124.98 | 142.97 | 134.67 | 149.33 | 146.19 | 0.00 | 0.00 | 0.00 |
| mole | 0.55 | 0.55 | 0.63 | 0.59 | 0.66 | 0.64 | 0.00 | 0.00 | 0.00 |
| vol, ml | 135 | 134 | 154 | 145 | 161 | 157 | 0 | 0 | 0 |
| Potassium t-butoxide | 3.94 | 3.90 | 4.01 | 3.88 | 3.79 | 3.52 | 3.66 | 3.70 | 3.75 |
| mole | 0.0351 | 0.0347 | 0.0357 | 0.0346 | 0.0338 | 0.0314 | 0.0326 | 0.0330 | 0.0334 |
| Ethylbenzene, g | 69.2 | 68.6 | 69.9 | 67.8 | 66.2 | 61.4 | 68.2 | 69.0 | 69.9 |
| mole | 0.65 | 0.65 | 0.66 | 0.64 | 0.62 | 0.58 | 0.64 | 0.65 | 0.66 |
| vol, ml | 80 | 79 | 81 | 78 | 76 | 71 | 79 | 80 | 81 |
| TMEDA, g | 18.53 | 17.93 | 19.90 | 19.29 | 18.83 | 17.47 | 17.48 | 17.67 | 17.90 |
| mole | 0.159 | 0.154 | 0.171 | 0.166 | 0.162 | 0.150 | 0.150 | 0.152 | 0.154 |
| vol, ml | 23.91 | 23.14 | 25.68 | 24.89 | 24.30 | 22.55 | 22.55 | 22.80 | 23.09 |
| n-Butyllithium, M | 2.0 | 2.0 | 2.0 | 2.0 | 2.0 | 2.0 | 2.0 | 2.0 | 2.0 |
| vol, ml | 18.44 | 18.40 | 18.91 | 18.67 | 18.67 | 17.42 | 18.43 | 19.65 | 21.88 |
| mole | 0.0369 | 0.0368 | 0.0378 | 0.0373 | 0.0373 | 0.0348 | 0.0369 | 0.0393 | 0.0438 |
| Total mass, g | 14.32 | 14.29 | 14.68 | 14.50 | 14.50 | 13.53 | 14.31 | 15.26 | 16.99 |
| neat mass, g | 2.3628 | 2.358 | 2.4222 | 2.3925 | 2.3925 | 2.23245 | 2.36115 | 2.5179 | 2.80335 |
| Monomer: styrene, g | 1141.5 | 1151.6 | 1038.8 | 1032.6 | 1030.2 | 1017.8 | 1037.8 | 1041.3 | 1044.9 |
| mole | 10.96 | 11.06 | 9.97 | 9.91 | 9.89 | 9.77 | 9.96 | 10.00 | 10.03 |
| vol, ml | 1256 | 1267 | 1143 | 1136 | 1133 | 1120 | 1142 | 1146 | 1150 |
| feed rate ml/min | 6.9 | 6.95 | 7 | 7 | 7.35 | 7.35 | 7.5 | 7.5 | 7.5 |
| time of feed, min | 182 | 182 | 163 | 162 | 154 | 152 | 152 | 153 | 153 |
| feed rate g/min | 6.27 | 6.32 | 6.36 | 6.36 | 6.68 | 6.68 | 6.82 | 6.82 | 6.82 |
| feed velocity ft/s | 1.88 | 1.88 | 1.88 | 1.88 | 1.98 | 1.98 | 2.02 | 2.02 | 2.02 |

TABLE IX-continued

SASH catalyzed process w/uniform hydrogen transfer to condensed phase, w/or w/o recycle and with low velocity feed

| Example | 52 | 53 | 54 | 55 | 56 | 57 | 58 | 59 | 60 |
|---|---|---|---|---|---|---|---|---|---|
| Process Scale-Up Parameters | | | | | | | | | |
| mole lithium/mole potassium | 1.05 | 1.06 | 1.06 | 1.08 | 1.11 | 1.11 | 1.13 | 1.19 | 1.31 |
| Mole TMEDA/mole alkali | 2.21 | 2.16 | 2.33 | 2.31 | 2.28 | 2.27 | 2.16 | 2.10 | 2.00 |
| Total Charge intial, g. | 420 | 418 | 542 | 548 | 556 | 539 | 537 | 540 | 531 |
| Total Charge final, g | 1562 | 1569 | 1581 | 1581 | 1586 | 1557 | 1575 | 1581 | 1576 |
| Initial KH* conc. ppm | 3522 | 3534 | 2796 | 2731 | 2695 | 2594 | 2752 | 2920 | 3308 |
| Final KH* conc. ppm | 947 | 941 | 959 | 947 | 945 | 898 | 939 | 997 | 1114 |
| mole styrene/mole Li | 297 | 300 | 264 | 265 | 265 | 280 | 270 | 254 | 229 |
| mole sty/mole Li/hr | 98 | 99 | 97 | 98 | 103 | 110 | 107 | 100 | 90 |
| mole sty./mole Org. CTA | 3.68 | 3.72 | 2.48 | 2.40 | 2.39 | 2.43 | 2.11 | 2.11 | 2.16 |
| mole styr/hr/mole Org. CTA | 1.21 | 1.23 | 0.91 | 0.89 | 0.93 | 0.96 | 0.83 | 0.83 | 0.85 |
| GPC MWD trimer and above | | | | | | | | | |
| $M_n$ | 822 | 732 | 533 | 555 | 595 | 566 | 668 | 656 | 590 |
| $M_w$ | 1186 | 1031 | 681 | 722 | 794 | 756 | 908 | 904 | 795 |
| Mz | 1571 | 1377 | 892 | 961 | 1072 | 1059 | 1213 | 1232 | 1103 |
| $PD_n$ | 1.443 | 1.408 | 1.278 | 1.301 | 1.334 | 1.336 | 1.522 | 1.546 | 1.515 |
| $\sigma_n$ | 547 | 468 | 281 | 304 | 344 | 328 | 400 | 401 | 340 |
| $_n\alpha_3$ | 1.456 | 1.625 | 2.086 | 2.120 | 2.073 | 2.530 | 1.813 | 1.953 | 2.327 |
| EB Strip. SASH PS, g. | 2476.8 | | 2299.8 | | 2340.0 | | 2160.8 | | 1100.040 |
| polymer yield %, g | 97% | | 98% | | 100% | | 104% | | 105% |
| Dimer strip. polymer yield, g | 2160 | | 1790 | | 1869 | | 1933 | | 932.01 |
| yield % on monomer | 99% | | 87% | | 91% | | 93% | | 89% |
| $M_n$ | 776 | | 559 | | 549 | | 665 | | 605 |
| $M_w$ | 1110 | | 719 | | 762 | | 911 | | 812 |
| Mz | 1476 | | 941 | | 1053 | | 1226 | | 1119 |
| $PD_n$ | 1.43 | | 1.29 | | 1.39 | | 1.37 | | 1.34 |
| $\sigma_n$ | 509 | | 299 | | 342 | | 404 | | 354 |
| $_n\alpha_3$ | 1.52 | | 2.00 | | 2.06 | | 1.85 | | 2.28 |

What is claimed:

1. A process for anionic chain transfer polymerization comprising feeding a vinyl aromatic and/or conjugated diene monomer under an atmosphere comprising molecular hydrogen to a reactor vessel containing a reaction mixture of an inert ethereal solvent and an alkali metal or alkali metal alloy.

2. The process of claim 1, wherein said vinyl aromatic monomer is a styrenic monomer.

3. The process of claim 1, wherein the reaction mixture further comprises an electron transfer entraining agent.

4. The process of claim 1, wherein the ethereal solvent and alkali metal or alkali metal alloy are initially charged into the reactor vessel and agitated using high shear mixing to create a dispersion of the initially charged alkali metal or alkali metal alloy.

5. The process of claim 1, wherein the partial pressure of hydrogen is maintained at pressures between about 1.0 Bar to about 20 Bar.

6. The process of claim 1, wherein the alkali metal alloy is comprised of sodium and potassium.

7. The process of claim 1 wherein the molar ratio of g-atom alkali metal or alkali metal alloy to styrenic monomer is in the range of about 1:10 to about 1:100.

8. The process of claim 1 where the vinyl aromatic monomer is styrene, the ethereal solvent is tetrahydrofuran and the sodium potassium alloy is $NaK_2$.

9. The process of claim 1 where the vinyl aromatic monomer is styrene, the ethereal solvent is tetrahydrofuran, the sodium potassium alloy is $NaK_2$ and the partial pressure of hydrogen is maintained at pressures between about 2.5 Bar to about 10 Bar.

* * * * *